(12) United States Patent
Perry et al.

(10) Patent No.: US 9,180,408 B2
(45) Date of Patent: Nov. 10, 2015

(54) FUEL EFFICIENT AMMONIA GENERATION STRATEGY FOR LEAN-BURN ENGINES UTILIZING PASSIVE NH3-SCR FOR THE CONTROL OF NOX

(75) Inventors: Kevin L. Perry, Fraser, MI (US); Wei Li, Troy, MI (US); Kushal Narayanaswamy, Sterling Heights, MI (US); Paul M. Najt, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 896 days.

(21) Appl. No.: 13/049,973

(22) Filed: Mar. 17, 2011

(65) Prior Publication Data

US 2011/0202253 A1 Aug. 18, 2011

Related U.S. Application Data

(63) Continuation-in-part of application No. 12/430,819, filed on Apr. 27, 2009, now Pat. No. 8,381,512.

(60) Provisional application No. 61/049,804, filed on May 2, 2008.

(51) Int. Cl.
*F01N 3/00* (2006.01)
*B01D 53/94* (2006.01)
*F01N 3/035* (2006.01)
*F01N 3/08* (2006.01)
(Continued)

(52) U.S. Cl.
CPC ........ *B01D 53/9477* (2013.01); *B01D 53/9495* (2013.01); *F01N 3/035* (2013.01); *F01N 3/0807* (2013.01); *F01N 3/0842* (2013.01); *F01N 3/101* (2013.01); *F01N 3/103* (2013.01); *F01N 13/009* (2014.06); *F02D 41/027* (2013.01); *F02D 41/146* (2013.01); *F02D 41/1463* (2013.01); *B01D 53/9418* (2013.01); *B01D 53/9445* (2013.01); *B01D 2251/2062* (2013.01); *F02D 2041/1468* (2013.01); *F02D 2200/0802* (2013.01); *Y02T 10/22* (2013.01); *Y02T 10/24* (2013.01)

(58) Field of Classification Search
CPC ............... F02D 2200/0802; F02D 2041/1468; F02D 41/146; F02D 41/027; Y02T 10/24; B01D 53/9418; F01N 3/2073; F01N 3/103
USPC ............ 60/274, 286, 295, 301; 701/102, 201; 477/100
See application file for complete search history.

(56) References Cited

U.S. PATENT DOCUMENTS 4,596,164 A * 6/1986 Hasegawa et al. ............... 477/98
6,032,461 A * 3/2000 Kinugasa et al. ............... 60/295
(Continued)

FOREIGN PATENT DOCUMENTS

JP 01176839 A * 7/1989 ............... F16H 5/40
JP 04362367 A * 12/1992 ............. F16H 63/40

*Primary Examiner* — Jason Shanske
*Assistant Examiner* — Matthew T Largi

(57) ABSTRACT

A method and system for operating an ammonia generation cycle in an internal combustion engine and a connected aftertreatment system includes monitoring a parameter of engine operation, comparing the parameter of engine operation to a threshold delineating operation of the engine in one of a stoichiometric operation and rich operation, and operating the ammonia generation cycle based upon the comparing indicating the parameter of engine operation exceeding the threshold.

15 Claims, 12 Drawing Sheets

(51) Int. Cl.
  *F01N 3/10* (2006.01)
  *F02D 41/02* (2006.01)
  *F02D 41/14* (2006.01)
  *F01N 13/00* (2010.01)

(56) References Cited

U.S. PATENT DOCUMENTS

| | | | |
|---|---|---|---|
| 6,467,255 B1 * | 10/2002 | Grob et al. | 60/274 |
| 6,662,553 B2 * | 12/2003 | Patchett et al. | 60/286 |
| 7,021,050 B2 * | 4/2006 | Nishimura et al. | 60/295 |
| 8,392,091 B2 * | 3/2013 | Hebbale et al. | 701/102 |
| 2003/0047164 A1 * | 3/2003 | Jaye | 123/352 |
| 2007/0028601 A1 * | 2/2007 | Duvinage et al. | 60/286 |
| 2009/0156358 A1 * | 6/2009 | Shamis et al. | 477/100 |
| 2010/0043401 A1 | 2/2010 | Der Matheossian | |
| 2010/0043402 A1 | 2/2010 | Perry et al. | |
| 2010/0087994 A1 * | 4/2010 | Bai | 701/54 |
| 2010/0107605 A1 | 5/2010 | Brinkman et al. | |
| 2010/0107606 A1 | 5/2010 | Narayanaswamy et al. | |

* cited by examiner

FUEL EFFICIENT AMMONIA GENERATION STRATEGY FOR LEAN-BURN ENGINES UTILIZING PASSIVE NH3-SCR FOR THE CONTROL OF NOX

CROSS REFERENCE TO RELATED APPLICATIONS

This application is a continuation-in-part of U.S. application Ser. No. 12/430,819 filed on Apr. 27, 2009, which claims the benefit of U.S. Provisional Application No. 61/049,804 filed on May 2, 2008, both of which are incorporated herein by reference.

TECHNICAL FIELD

This disclosure is related to control of aftertreatment of NOx emissions in internal combustion engines.

BACKGROUND

The statements in this section merely provide background information related to the present disclosure and may not constitute prior art.

Manufacturers of internal combustion engines are continually developing new engine control strategies to satisfy customer demands and meet various regulations. One such engine control strategy includes operating an engine at an air/fuel ratio that is lean of stoichiometry to improve fuel economy and reduce emissions. Such engines include both compression-ignition and lean-burn spark-ignition engines.

Lean engine operation may produce oxides of nitrogen (NOx), a known by-product of combustion, when nitrogen and oxygen molecules present in engine intake air disassociate in the high temperatures of combustion. Rates of NOx production follow known relationships to the combustion process, for example, with higher rates of NOx production being associated with higher combustion temperatures and longer exposure of air molecules to the higher temperatures.

NOx molecules produced in the combustion chamber can be reduced to nitrogen and oxygen molecules in aftertreatment devices. Efficacy of known aftertreatment devices is largely dependent upon operating conditions, such as device operating temperature driven by exhaust gas flow temperatures and engine air/fuel ratio. Additionally, aftertreatment devices include materials prone to damage or degradation in-use due to exposure to high temperatures and contaminants in the exhaust gas feedstream.

Known engine operating strategies to manage combustion to increase fuel efficiency include operating at a lean air/fuel ratio, using localized or stratified charge combustion within the combustion chamber while operating in an unthrottled condition. While temperatures in the combustion chamber can get high enough in pockets of combustion to create significant quantities of NOx, the overall energy output of the combustion chamber, in particular, the heat energy expelled from the engine through the exhaust gas flow can be greatly reduced from normal values. Such conditions can be challenging to exhaust aftertreatment strategies, as the aftertreatment devices frequently require elevated operating temperatures, driven by the exhaust gas flow temperature, to operate adequately to treat NOx emissions.

Aftertreatment systems include catalytic devices to generate chemical reactions to treat exhaust gas constituents. Three-way catalytic devices (TWC) are utilized particularly in gasoline applications to treat exhaust gas constituents. Lean NOx absorbers (NOx trap) utilize catalysts capable of storing some amount of NOx, and engine control technologies have been developed to combine these NOx absorbers with fuel efficient engine control strategies to improve fuel efficiency and still achieve acceptable levels of NOx emissions. One known strategy includes using a lean NOx adsorber to store NOx emissions during lean operations and then purge and reduce the stored NOx during rich engine operating conditions with a TWC to nitrogen and water. Particulate filters (DPF) trap soot and particulate matter in diesel applications, and the trapped material is periodically purged during high temperature regeneration events.

One known aftertreatment device includes a selective catalytic reduction device (SCR). The SCR device includes catalytic material that promotes the reaction of NOx with a reductant, such as ammonia or urea, to produce nitrogen and water. The reductants may be injected into an exhaust gas feedstream upstream of the SCR device, requiring injection systems, tanks and control schemes. The tanks may require periodic refilling and can freeze in cold climates requiring additional heaters and insulation.

Catalytic materials used in SCR devices include vanadium (V) and tungsten (W) on titanium (Ti) and base metals including iron (Fe) or copper (Cu) with a zeolite washcoat. Catalytic materials including copper may perform effectively at lower temperatures but have been shown to have poor thermal durability at higher temperatures. Catalytic materials including iron may perform well at higher temperatures but with decreasing reductant storage efficiency at lower temperatures.

For mobile applications, SCR devices generally have an operating temperature range of 150° C. to 600° C. The temperature range may vary depending on the catalyst. This operating temperature range can decrease during or after higher load operations. Temperatures greater than 600° C. may cause reductants to breakthrough and degrade the SCR catalysts, while the effectiveness of NOx processing decreases at temperatures lower than 150° C.

SUMMARY

A method and system for operating an ammonia generation cycle in an internal combustion engine and a connected aftertreatment system includes monitoring a parameter of engine operation, comparing the parameter of engine operation to a threshold delineating operation of the engine in one of a stoichiometric operation and rich operation, and operating the ammonia generation cycle based upon the comparing indicating the parameter of engine operation exceeding the threshold.

BRIEF DESCRIPTION OF THE DRAWINGS

One or more embodiments will now be described, by way of example, with reference to the accompanying drawings in which.

DETAILED DESCRIPTION

Figure 1:
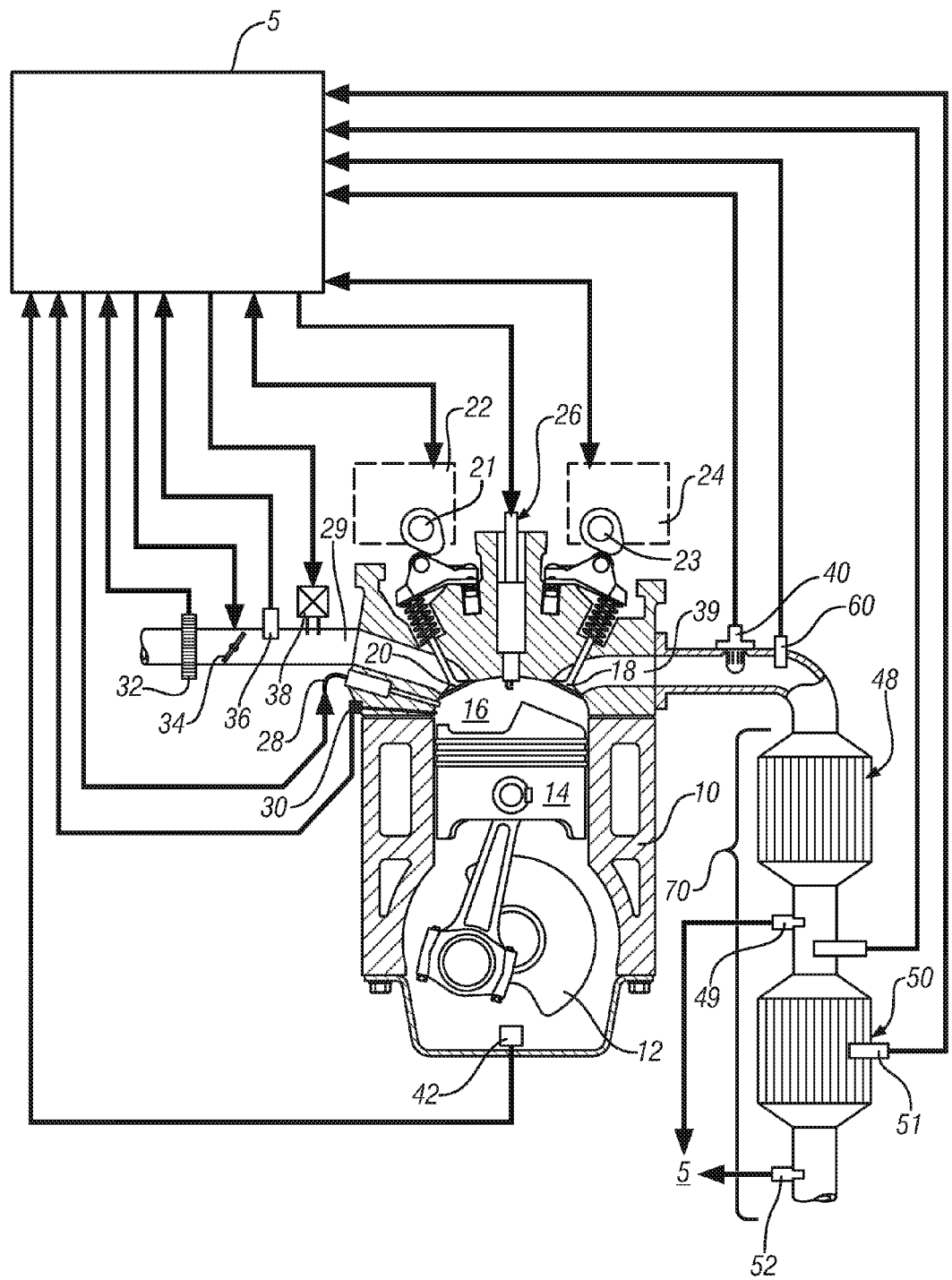
FIG. 1 illustrates an exemplary engine system and aftertreatment system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10, aftertreatment system 70, and an accompanying control module 5 that have been constructed in accordance with an embodiment of the disclosure. The engine 10 is selectively operative at a rich air/fuel ratio (AFR), a stoichiometric AFR, and at an AFR that is primarily lean of stoichiometry. The disclosure can be applied to various internal combustion engine systems and combustion cycles.

In one embodiment the aftertreatment system 70 can be connected to the engine 10 that is coupled to an electro-mechanical hybrid powertrain system. The electro-mechanical hybrid powertrain system can include torque machines configured to transfer tractive power to a driveline of a vehicle.

The exemplary engine 10 includes a multi-cylinder direct-injection four-stroke internal combustion engine having reciprocating pistons 14 slidably movable in cylinders 15 which define variable volume combustion chambers 16. The pistons 14 are connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism configured to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism configured to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, including an air/fuel ratio sensor in one embodiment. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 executes algorithmic code stored therein to control actuators to control engine operation, including throttle position, spark timing, fuel injection mass and timing, intake and/or exhaust valve timing and phasing, and exhaust gas recirculation valve position to control flow of recirculated exhaust gases. Valve timing and phasing may include negative valve overlap and lift of exhaust valve reopening (in an exhaust re-breathing strategy). The control module 5 is configured to receive input signals from an operator (e.g., a throttle pedal position and a brake pedal position) to determine an operator torque request and input from the sensors indicating the engine speed and intake air temperature, and coolant temperature and other ambient conditions.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine operating parameters. The control module 5 is configured to receive input signals from an operator (e.g., via a throttle pedal and a brake pedal) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control AFR based upon feedback from the exhaust gas sensor 40. The exhaust gas sensor 40 can include a wide-range air/fuel ratio sensor configured to generate a linear signal corresponding to air/fuel ratio over an air/fuel ratio range. Alternatively, in one embodiment the exhaust gas sensor 40 can include a switch-type stoichiometric sensor configured to generate an output signal that corresponds to an air/fuel ratio that is one of rich of stoichiometry and lean of stoichiometry.

The exhaust aftertreatment system 70 is fluidly connected to the exhaust manifold 39 and includes a catalytic device 48 and an ammonia-selective catalytic reduction (NH3-SCR) device 50. The catalytic device 48 is fluidly and serially connected upstream of the ammonia-selective catalytic reduction device 50. Preferably the catalytic device 48 is located in an engine compartment and is close-coupled to the exhaust manifold 39. Preferably the NH3-SCR device 50 is located in an underfloor location at an extended distance from the catalytic device 48 determined based upon engine and exhaust gas feedstream operating temperatures and other factors. The exhaust aftertreatment system 70 may include other catalytic and/or trap substrates operative to oxidize, adsorb, desorb, reduce, and combust elements of the exhaust gas feedstream as described herein below.

The exhaust aftertreatment system 70 can be equipped with various sensing devices for monitoring the exhaust gas feedstream from the engine 10, including a first NOx sensor 49, a second NOx sensor 52, and an SCR temperature sensor 51 signally connected to the control module 5. FIG. 1 depicts one exemplary arrangement of such sensing devices. However, it will be appreciated that a number of such arrangements including locations and types of sensing devices are known in the art. The first and second NOx sensors 49 and 52 detect and quantify NOx molecules in the exhaust gas feedstream. The first NOx sensor 49 detects and quantifies NOx molecules in the exhaust gas feedstream exiting the catalytic device 48 and entering the NH3-SCR device 50. An additional NOx sensor 60 may be included in the exhaust aftertreatment system 70 to detect and quantify NOx molecules in the exhaust gas feedstream entering the aftertreatment system 70. In one embodiment only the second NOx sensor 52 is included on the aftertreatment system 70.

During engine operation, the exemplary engine 10 generates an exhaust gas feedstream containing constituent elements that can be transformed in the aftertreatment system, including hydrocarbons (HC), carbon monoxide (CO), oxides of nitrogen (NOx), and particulate matter (PM), among others. Oxygen ($O_2$) is present in the exhaust gas feedstream after operating the engine 10 lean of stoichiometry. Hydrogen ($H_2$) production can occur in the engine 10 through the combustion process. Combustion in a stoichiometric or rich AFR environment, wherein molecular oxygen is scarce, tends to produce elevated levels of molecular hydrogen.

The catalytic device 48 performs a number of catalytic functions for treating an exhaust gas flow. The catalytic device 48 oxidizes hydrocarbons (HC) and carbon monoxide (CO). The catalytic device 48 is formulated to produce ammonia during stoichiometric and rich engine operation. The formulation may involve using varying catalysts including platinum group metals, e.g., platinum, palladium, and rhodium, with cerium and zirconium oxides for oxygen storage capacity. In one embodiment, the catalytic device 48 is a three-way catalytic converter configured to oxidize hydrocarbons (HC) and carbon monoxide (CO) and reduce NOx during stoichiometric engine operations.

The NH3-SCR device 50 reduces NOx into other molecules, including nitrogen and water as described hereinbelow. An exemplary NH3-SCR device 50 includes a substrate coated with a zeolite washcoat and catalytic material including a catalytically active base metal. The substrate includes a cordierite or metal monolith with a cell density about 62 to 93 cells per square centimeter (400-600 cells per square inch), and a wall thickness about three to seven mils. The cells of the substrate include flow passages through which exhaust gas flows to contact the catalyst to effect storage of ammonia. The substrate is impregnated with the zeolite washcoat. The zeolite washcoat also contains the catalytically active base metals, e.g., iron (Fe), copper (Cu), cobalt (Co), nickel (Ni). Alternatively, vanadium-based and/or tungsten (W) on titanium (Ti) compositions may be used as catalysts. Copper catalysts have been shown to perform effectively at lower temperatures, e.g., 100° C. to 450° C., but have poor thermal durability. Iron catalysts may perform well at higher temperatures, e.g., 200° C. to 650° C., but with decreasing reductant storage capacity.

The NH3-SCR device 50 stores ammonia to reduce NOx emissions. The stored ammonia-selectively reacts with NOx in the presence of the catalytic materials to produce nitrogen and water. The following equations represent the primary reactions with ammonia within the NH3-SCR device 50:

$$4NO+4NH_3+O_2 \rightarrow 4N_2+6H_2O \qquad [1]$$

$$3NO_2+4NH_3 \rightarrow 3.5N_2+6H_2O \qquad [2]$$

$$2NO+2NO_2+4NH_3 \rightarrow 4N_2+6H_2O \qquad [3]$$

Multiple secondary reactions may concurrently occur and will vary depending on the type of fuel consumed.

In accordance with the present disclosure, engine operation is controlled to generate an exhaust gas feedstream including nitric oxide (NO), carbon monoxide (CO), and hydrogen ($H_2$) to produce ammonia in a catalytic device, such as the catalytic device 48.

Ammonia may be produced in the catalytic device 48 from a conversion process represented by the following equation:

$$NO+CO+1.5H_2 \rightarrow NH_3+CO_2 \qquad [4]$$

One having ordinary skill in the art will appreciate that this conversion requires molecular oxygen to be depleted from the catalytic device 48 before NO will react with the molecular hydrogen. In one embodiment, sufficient conversion occurred at temperatures exceeding 250° C. in the catalytic device 48. Excess oxygen is frequently present when the internal combustion engine is operated in lean operating modes, with a lean AFR or with excess air. Thus, the control module 5 controls the AFR to a stoichiometric AFR or rich AFR to deplete oxygen in the exhaust gas feedstream when ammonia production in the catalytic device 48 is desired.

Further, selection of an AFR within the stoichiometric and rich operating ranges further facilitates ammonia production, for example, by producing nitric oxide (NO) and hydrogen ($H_2$) in appropriate ratios. Eq. 4 corresponds to an ideal ratio of 1.5:1 of hydrogen to nitric oxide ($H_2$:NO). However, based upon the environment provided by the NH3-SCR device 50 and other reactions taking place within the catalytic device 48, a different actual ratio of hydrogen ($H_2$) to nitric oxide (NO) can produce ammonia. For example, a ratio of between 3:1 and 5:1 hydrogen to nitric oxide ($H_2$:NO) is preferred in one embodiment.

Controlling engine operation includes operating the engine 10 rich or at stoichiometry while meeting the operator torque request and without changing engine output power. One exemplary method for operating the exemplary engine 10 rich of stoichiometry can include executing multiple fuel injection pulses during a combustion cycle including injecting a first fuel pulse into the combustion chamber 16 during each compression stroke. The mass of fuel injected during the first fuel pulse is determined based upon an amount sufficient to operate the engine 10 to meet the operator torque request and other load demands. Subsequent fuel pulses can be injected into the combustion chamber 16 during other strokes of the combustion cycle thereby generating an exhaust gas feedstream including nitric oxide (NO), carbon monoxide (CO), and hydrogen ($H_2$) to produce ammonia in the catalytic device 48. In one embodiment, the subsequent fuel pulses are executed late in a power stroke or early in an exhaust stroke of the combustion cycle thereby minimizing likelihood of combustion in the combustion chamber 16.

Selection of a catalytically active material that enables lower ratios of hydrogen ($H_2$) molecules to nitric oxide (NO) molecules on the catalytic device 48 is preferable, as hydrogen requirements directly relate to an amount of fuel that is consumed by the subsequent fuel pulses to enable ammonia production. Calibration according to test results or modeling according to methods sufficient to accurately estimate engine operation, aftertreatment processes, and conversions can be utilized to select a preferred AFR to control ammonia production. One having ordinary skill in the art will appreciate that carbon monoxide (CO) presence must also be considered to facilitate the reaction described above.

Ammonia production can be controlled or enabled according to a number of factors affecting ammonia usage within the NH3-SCR device 50, including estimated ammonia storage, estimated or detected ammonia breakthrough, estimated or detected NOx breakthrough downstream from the NH3-SCR device 50, and engine operation conducive to ammonia production. Monitoring of these factors can be accomplished through monitoring a number of inputs, including engine operation, exhaust gas properties, and NOx conversion efficiency within the NH3-SCR device 50. For example, the engine 10 produces higher levels of NOx and hydrogen during engine acceleration. Such periods conducive to ammonia production can be utilized to minimize intrusive operation of ammonia production under engine operating conditions less conducive thereto. Periods of engine operation to produce ammonia will vary depending upon required ammonia production, the particulars of the system employed, and the particular operation of the engine 10.

Figure 2:
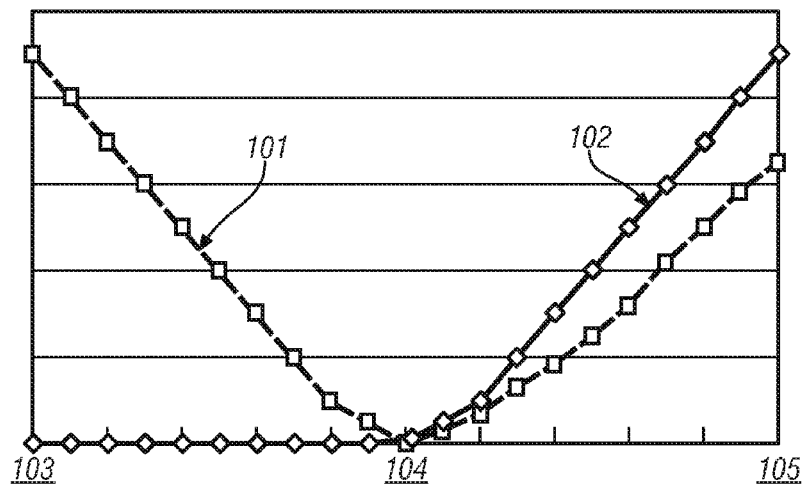
FIG. 2 illustrates exemplary test data from a NOx sensor and an ammonia sensor as a function of AFR, in accordance with the present disclosure.

FIG. 2 graphically illustrates exemplary test data showing signal outputs from a known NOx sensor and a known ammonia sensor as a function of AFR from the engine 10, illustrative of signal outputs from the first and second NOx sensors 49 and 52 and an ammonia sensor. The x-axis represents AFR and the y-axis represents signal output. Plot 101 represents a NOx sensor and plot 102 represents an $NH_3$ sensor. Point 103 represents lean operation, point 104 represents stoichiometric operation, and point 105 represents rich operation. Known NOx sensing technologies do not distinguish between NOx molecules and ammonia molecules in the exhaust gas feedstream. During lean engine operating conditions, when ammonia presence in the exhaust gas feedstream is minimal and NOx molecules are present, signal output from the NOx sensor indicates NOx molecules and increases with increasing AFR. Signal output from the ammonia sensor is minimal. At stoichiometric engine operating conditions, when NOx molecules and ammonia molecules present in the exhaust gas feedstream are minimal, signal output from the NOx sensor and the ammonia sensor are minimal. As the AFR decreases during rich engine operating conditions, the presence of ammonia molecules increase while NOx molecules are minimal in the exhaust gas feedstream. Signal output from the NOx sensor and the ammonia sensor increase during rich engine operation as the AFR decreases. Therefore, during rich engine operation increased signal output from the first and second NOx sensors 49 and 52 can be used to indicate ammonia molecules in the exhaust gas feedstream. Thus, ammonia breakthrough may be detected by monitoring signal output of the second NOx sensor 52 during rich engine operation. In one embodiment, the second NOx sensor 52 is monitored for increased signal output during ammonia production. When signal output from the second NOx sensor 52 increases, the control scheme 200 determines that ammonia breakthrough is occurring.

Figure 3:
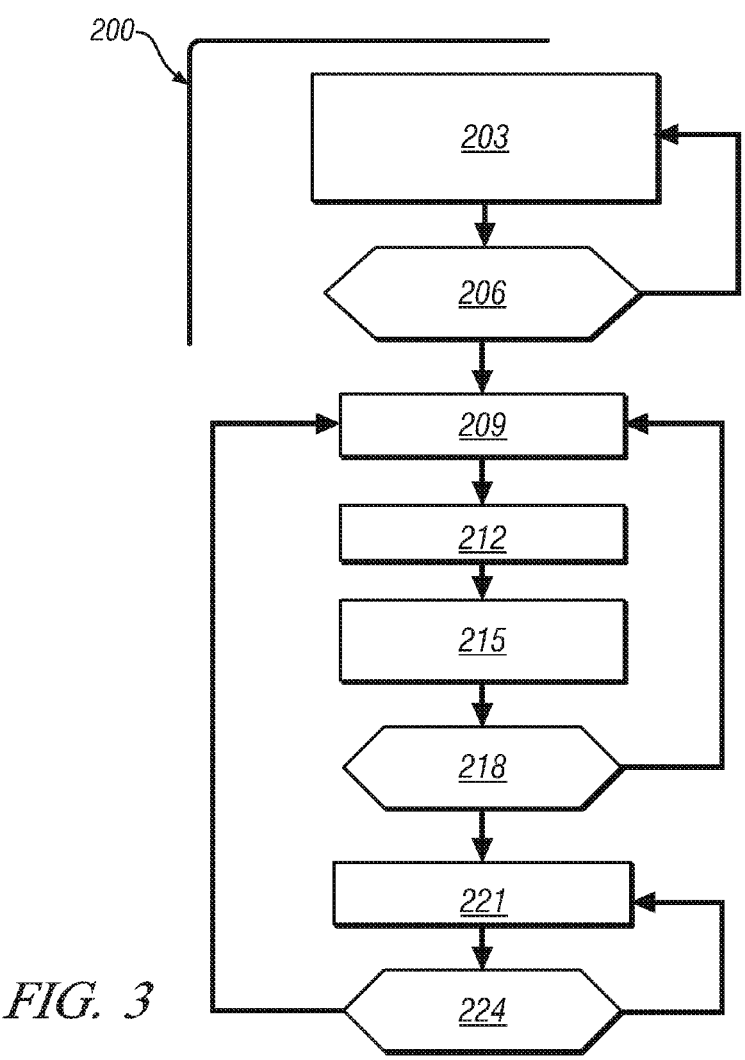
FIG. 3 illustrates a control scheme for managing an exhaust gas feedstream from the engine, in accordance with the present disclosure.

FIG. 3 shows a control scheme 200 for managing an exhaust gas feedstream from the engine 10 during engine operation. The control scheme 200 is depicted as a plurality of discrete elements. Such illustration is for ease of description and it should be recognized that the functions performed by these elements may be combined in one or more devices, e.g., implemented in software, hardware, and/or application-specific integrated circuitry. For example, the control scheme 200 may be executed as one or more algorithms in the control module 5. The control scheme 200 includes monitoring the exhaust gas feedstream and the aftertreatment system (203), including detecting NOx breakthrough and ammonia breakthrough downstream of the NH3-SCR device 50 using the second NOx sensor 52. Monitoring the aftertreatment system includes monitoring temperature of the NH3-SCR device 50 using the SCR temperature sensor 51.

Before initiating lean engine operation to produce ammonia, the temperature of the NH3-SCR device 50 must be within a predetermined temperature range (206). In one embodiment of the NH3-SCR device 50, the predetermined temperature range is 150° C. to 450° C. Preferably, the temperature of the NH3-SCR device 50 is monitored continuously using the SCR temperature sensor 51. When the temperature of the NH3-SCR device 50 is outside the predetermined temperature range, the control scheme returns to step 203 and engine operation may be controlled to a stoichiometric AFR.

When the temperature of the NH3-SCR device 50 is within the predetermined temperature range, the control scheme 200 controls engine operation to produce nitric oxide (NO), carbon monoxide (CO), and hydrogen ($H_2$) for ammonia production (209). Ammonia is produced in the catalytic device 48 as described hereinabove using the nitric oxide (NO), carbon monoxide (CO), and hydrogen ($H_2$) (212) and transferred downstream to the NH3-SCR device 50 for storage (215).

The control scheme 200 can adjust engine operation to discontinue ammonia production subsequent to determining the NH3-SCR device 50 is saturated with ammonia (218). Ammonia production can also be discontinued after a predetermined threshold of ammonia molecules are generated or when engine operating conditions are not conducive to ammonia production, e.g., during vehicle decelerations, engine idling, or engine stops Ammonia saturation may be estimated based upon a predetermined elapsed time, or by monitoring the exhaust gas feedstream downstream of the NH3-SCR device 50 to detect ammonia breakthrough, or determined after executing a predetermined number of cylinder events. Ammonia breakthrough may be detected by monitoring signal output of an ammonia sensor configured to monitor the exhaust gas feedstream downstream of the NH3-SCR device 50. Another method for detecting ammonia breakthrough includes monitoring the second NOx sensor 52. During rich engine operation, signal output from the second NOx sensor 52 increases, indicate ammonia breakthrough. In one embodiment, saturation may be estimated using a model according to methods sufficient to accurately estimate operation of the combustion cycle, aftertreatment processes, conversions, and monitored operating conditions including intake mass airflow, AFR, engine speed, TWC temperature, TWC aging state, SCR device temperature, and SCR device aging state. The model may be calibrated according to test results corresponding to a particular hardware application.

After determining the NH3-SCR device 50 is saturated with ammonia, the control scheme 200 discontinues ammonia production and transitions engine operation to lean engine operation (221), resulting in increased NOx emissions into the exhaust gas flow. The catalytic device 48 reduces a portion of the NOx emissions transferring oxygen and nitrogen downstream to the NH3-SCR device 50. Ammonia stored on the catalyst of the NH3-SCR device 50 reacts with NOx entering the NH3-SCR device 50 thereby reducing NOx emissions and producing nitrogen and water. The stored ammonia is depleted as ammonia molecules react with NOx molecules. When the ammonia on the catalyst of the NH3-SCR device 50 is depleted, NOx emissions pass through the NH3-SCR device 50 unprocessed.

Therefore, the control scheme 200 preferably discontinues lean engine operation after detecting NOx breakthrough downstream from the NH3-SCR device 50 (224). An increase in signal output from the second NOx sensor 52 is correlatable to an increase in NOx emissions out of the NH3-SCR device 50 during lean engine operation, and indicates NOx breakthrough. Another method for detecting NOx breakthrough includes modeling ammonia depletion Ammonia depletion and therefore NOx breakthrough may be estimated using a model according to methods sufficient to accurately estimate operation of the combustion cycle, aftertreatment processes, conversions, and monitored operating conditions including intake mass airflow, AFR, engine speed, TWC temperature, TWC aging state, SCR device temperature, and SCR device aging state. The model may be calibrated according to test results corresponding to a particular hardware application. After determining that ammonia is depleted or detecting NOx breakthrough, the control scheme 200 may control engine operation to produce ammonia (209).

Figure 4:
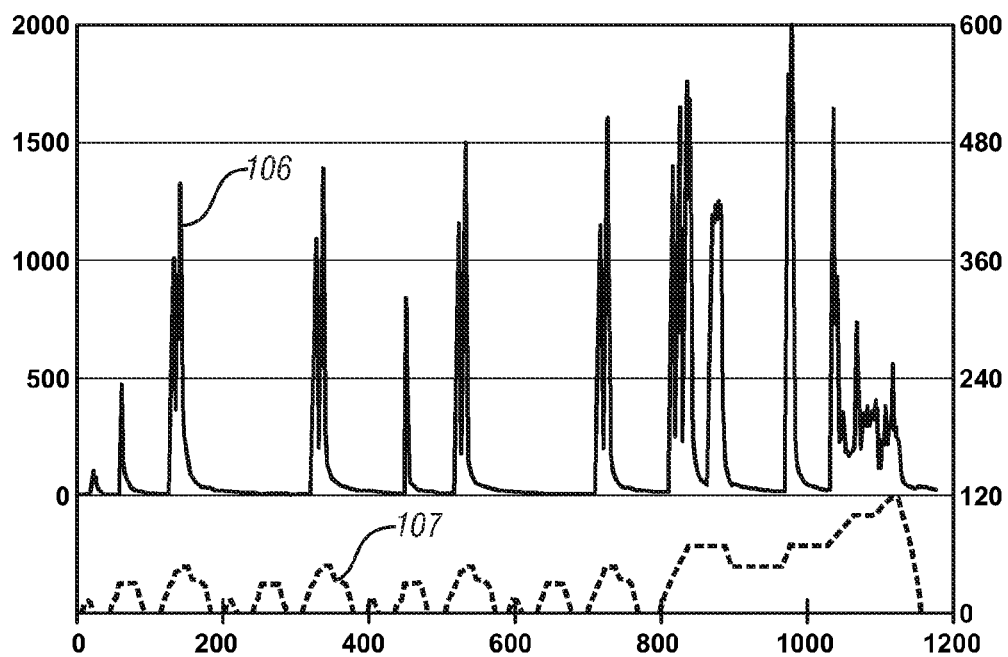
FIG. 4 illustrates exemplary test data depicting a relationship between ammonia production and vehicle speed, in accordance with the present disclosure.

FIG. 4 graphically depicts exemplary test data describing a relationship between ammonia production and vehicle speeds. The x-axis represents a test time in seconds, the left y-axis represents $NH_3$ concentration in ppm, and the right y-axis represents vehicle speed in km/h. Plot 106 represents $NH_3$ concentration through the depicted test time, and plot 107 represents vehicle speed through the depicted test time. Ammonia concentrations were measured with a Fourier-transform infrared spectrometer during engine operations using the exemplary aftertreatment system 70. As FIG. 4 shows, during engine accelerations, when the exemplary engine 10 operates at stoichiometry or slightly rich of stoichiometry (e.g., AFR between 13.8:1 and 14.2:1), ammonia concentrations produced by the catalytic device 48 can increase.

Figure 5:
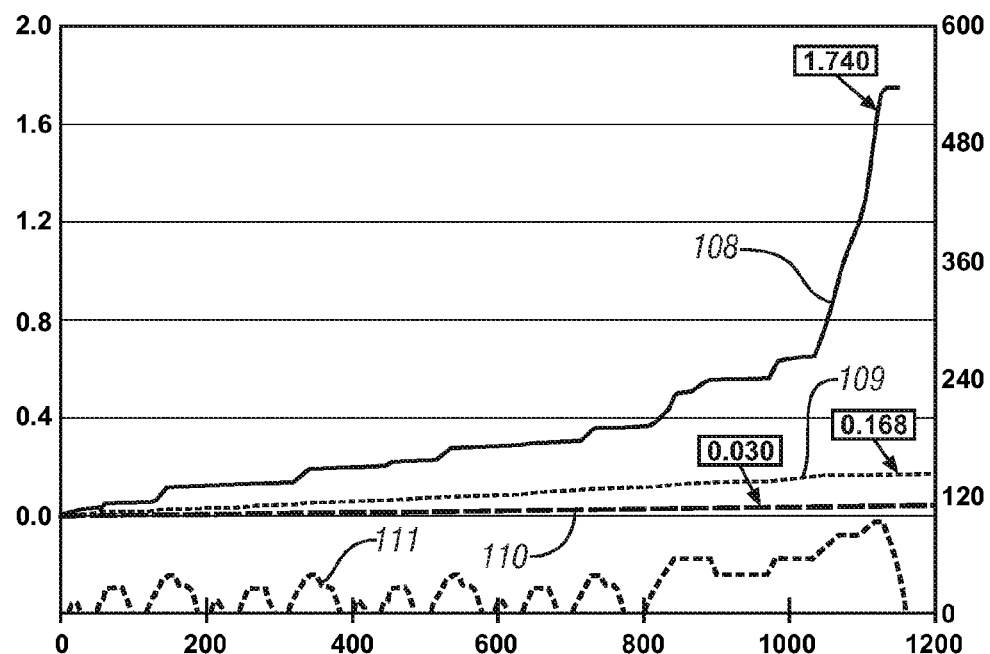
FIG. 5 illustrates exemplary test data depicting a relationship between cumulative NOx emissions and vehicle speed, in accordance with the present disclosure.

FIG. 5 graphically depicts exemplary test data depicting a relationship between cumulative NOx emissions out of the exemplary engine 10, catalytic device 48, and the NH3-SCR device 50 and vehicle speed. The x-axis represents a test time in seconds, the left y-axis represents cumulative NOx emissions in g/km, and the right y-axis represents a vehicle speed in km/h. Plot 108 represents a cumulative engine out NOx. Plot 109 represents a cumulative NOx measured after a three way catalyst device. Plot 110 represents a cumulative NOx measured after an SCR device. Plot 111 represents vehicle speed in km/h. When the exemplary engine 10 is controlled to alternate between lean and rich excursions, significantly less NOx emissions pass out of the aftertreatment system 70 than emitted by the exemplary engine 10 into the exhaust gas feedstream. FIG. 5 also depicts a NOx reduction by the NH3-SCR device 50 after NOx reduction in the catalytic device 48.

Figure 6:
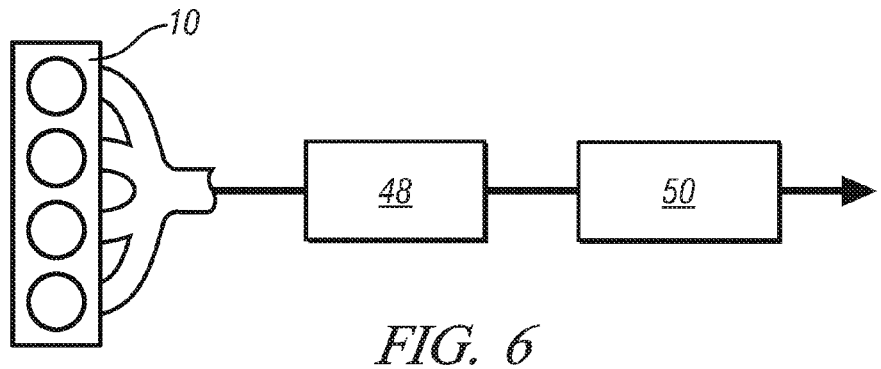
FIGS. 6-10 illustrate additional exemplary configurations of the exhaust aftertreatment system, in accordance with the present disclosure.
Figure 7:
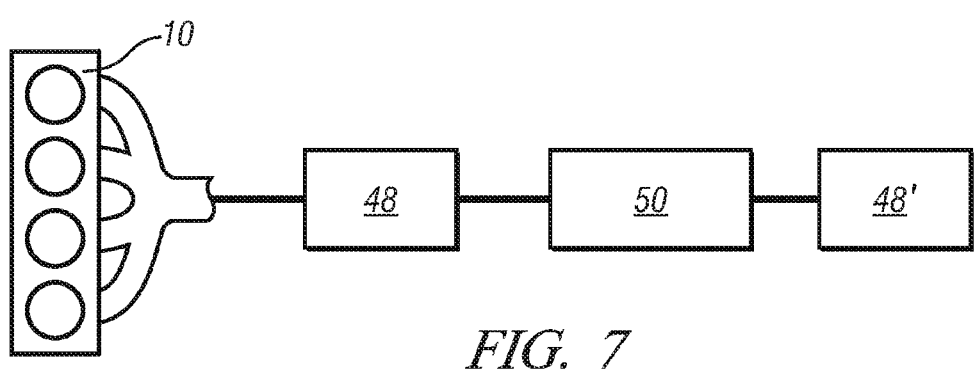
Figure 8:
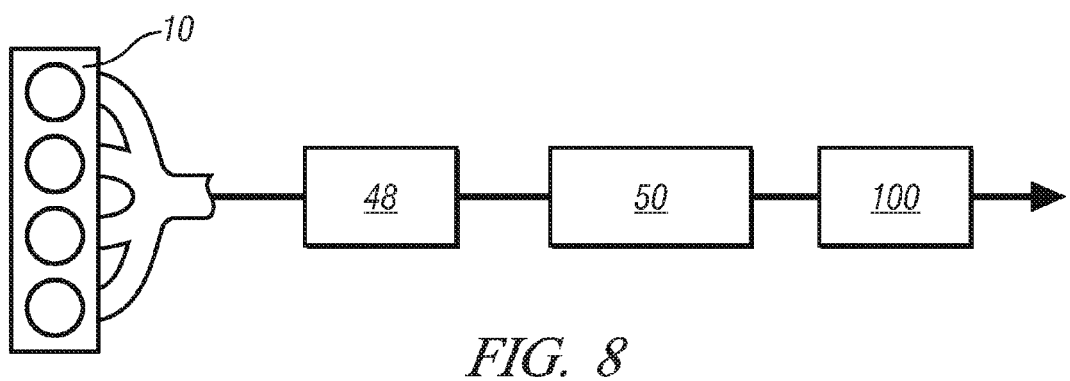
Figure 9:
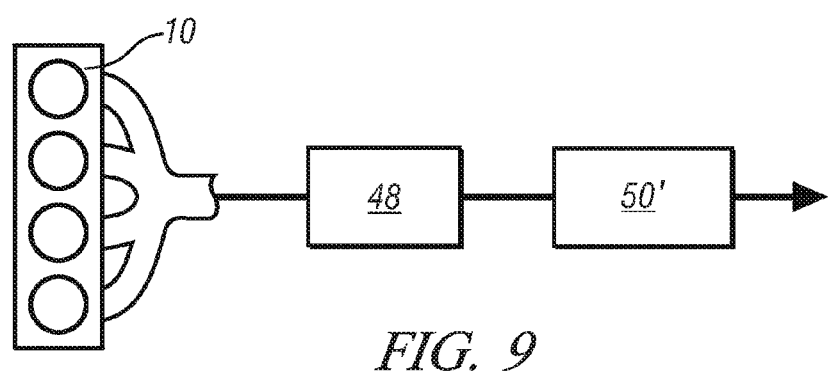

The abovementioned methods may be employed in engine systems using different exhaust aftertreatment configurations, with like numerals indicating like elements. FIG. 6 shows an engine 10 and an exhaust aftertreatment system including a particulate filter combined with a TWC (PF/TWC) 48 upstream of the NH3-SCR device 50. FIG. 7 shows an engine 10 and an exhaust aftertreatment system including a first TWC 48 upstream of the NH3-SCR device 50 and a second TWC 48' downstream of the NH3-SCR device 50. The second TWC 48' downstream of the NH3-SCR device 50 may include an oxidation catalyst for managing $NH_3$ breakthrough. FIG. 8 shows an engine 10 and an exhaust aftertreatment configuration including a TWC 48, a SCR device 50 (NH3-SCR) and a NOx adsorber device 100 (LNT) downstream of the NH3-SCR device 50. FIG. 9 shows an engine 10 and an exhaust aftertreatment configuration including a TWC 48, and a NH3-SCR device combined with a particulate filter 50'.

Figure 10:
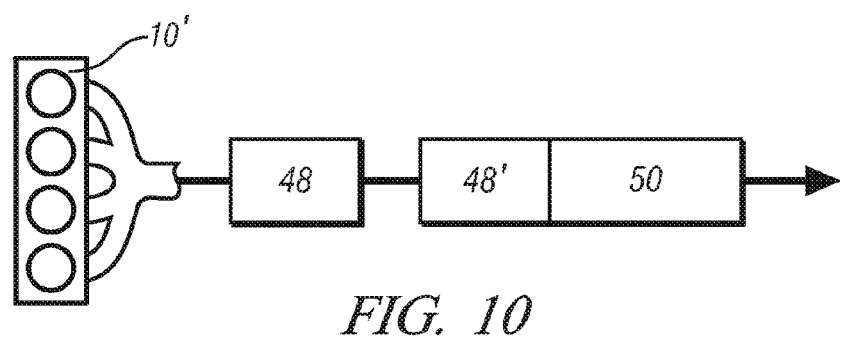

FIG. 10 shows another embodiment including an engine 10' and an exhaust aftertreatment configuration including a close-coupled TWC 48 and an underfloor converter including a second TWC 48' coupled to a NH3-SCR device 50. The engine 10' preferably includes a port-fuel injection engine that injects fuel into runners of an intake manifold upstream of each combustion chamber. The engine 10' is controlled to operate at or about stoichiometry within a narrowly controlled band for +/−ΔAFR about stoichiometry which can be an air/fuel ratio band of 14.6:1+/−0.05 in one embodiment.

Figure 11:
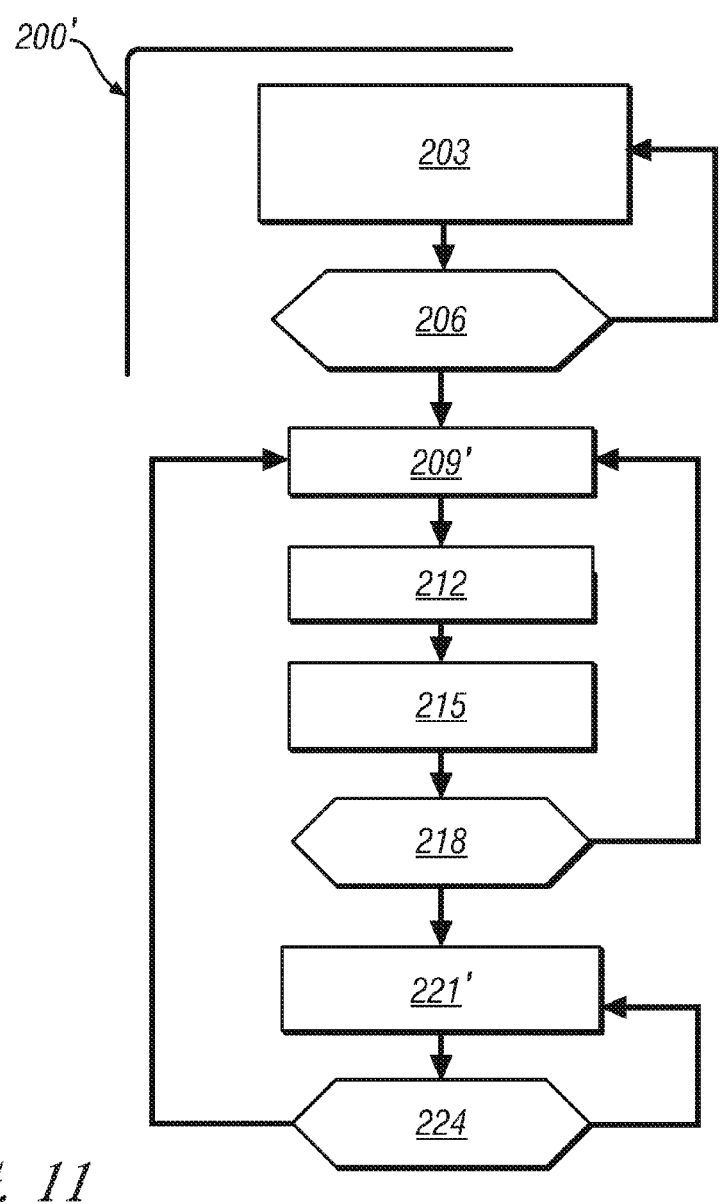
FIG. 11 illustrates a control scheme for managing an exhaust gas feedstream from the engine, in accordance with the present disclosure.

FIG. 11 shows a second control scheme 200' including a method for managing an exhaust gas feedstream from the embodiment described with reference to FIG. 10 including the port-fuel injection engine 10' and the aftertreatment system including the TWC 48 and the NH3-SCR device 50 during engine operations, with like elements identified using like numerals. The embodiment illustrated in FIG. 10 includes an engine-out exhaust gas sensor, a first NOx sensor upstream of the NH3-SCR device 50, a second NOx sensor downstream of the NH3-SCR device 50, and a temperature sensor configured to monitor temperature of the NH3-SCR device 50.

The control scheme 200' includes monitoring the exhaust gas feedstream and the aftertreatment system (203). Monitoring the exhaust gas feedstream includes detecting NOx breakthrough and ammonia breakthrough downstream of the NH3-SCR device 50 using the second NOx sensor. Monitoring the aftertreatment system can include monitoring temperature of the NH3-SCR device 50 using the SCR temperature sensor. Before controlling engine operation to produce ammonia, the temperature of the NH3-SCR device 50 is preferably within a predetermined temperature range that corresponds to the specific catalytic material including a catalytically active base metal that is used in the NH3-SCR device 50 (206). In one embodiment the predetermined temperature range is 150° C. to 450° C. for the NH3-SCR device 50. Preferably, the temperature of the NH3-SCR device 50 is monitored continuously using the SCR temperature sensor. In this control scheme 200', engine operation is preferably at or near stoichiometry. When the temperature of the NH3-SCR device 50 is outside the predetermined temperature range, the control scheme returns to step 203 and engine operation is controlled to prevent operation in a fuel cutoff mode, e.g., during decelerations, and prevent autonomic engine stops.

Figure 12:
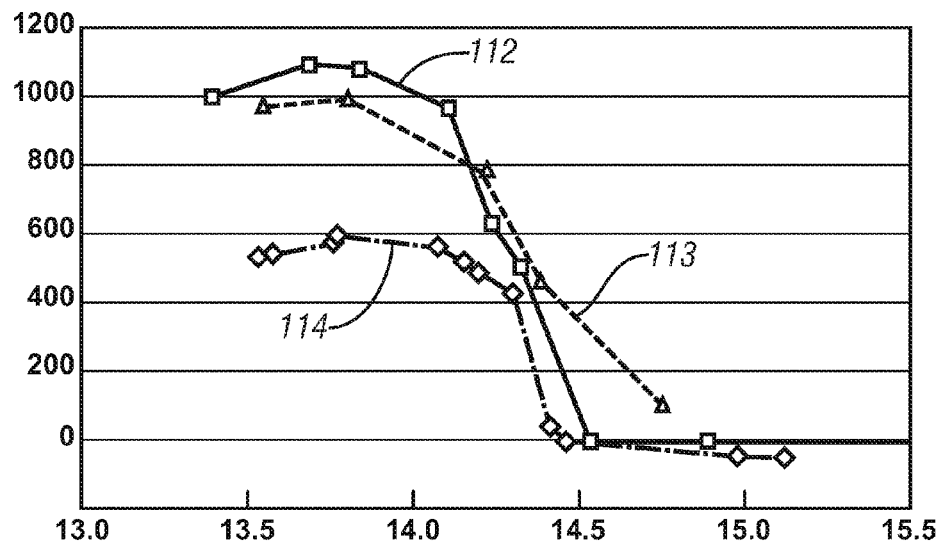
FIGS. 12-16 illustrate exemplary test data, in accordance with the present disclosure.

FIG. 12 shows $NH_3$ production corresponding to engine-out air/fuel ratio (AFR) in the exhaust gas feedstream downstream of a close-coupled three-way catalytic converter for an exemplary system at several engine loads (Low, Medium, High) at a predetermined engine operating speed (1000 rpm). The x-axis represents an AFR, and the y-axis represents an $NH_3$ concentration in ppm. Plot 112 represents high load operation, plot 113 represents medium load operation, and plot 114 represents low load operation. The results indicate that ammonia production maximizes at an air/fuel ratio of about 14:1, and within an air/fuel ratio range between 13.5:1 and 14.5:1, thus indicating a preferred air/fuel ratio point for maximizing ammonia production. The results further indicate that there is some ammonia production during stoichiometric operation when the engine-out air/fuel ratio oscillates rich and lean of stoichiometry, including when the air/fuel ratio oscillates rich and lean of stoichiometry with an expanded band for +/−ΔAFR about stoichiometry.

When the temperature of the NH3-SCR device 50 is within the predetermined temperature range, the control scheme 200' modulates engine operation to produce the nitric oxide (NO), carbon monoxide (CO), and hydrogen ($H_2$) for ammonia production (209'). In this embodiment, controlling engine operation may include operating the engine 10' at stoichiometry, operating the engine 10' at stoichiometry with an expanded band for +/−ΔAFR about stoichiometry, e.g., 14.6:1+/−0.2 in one embodiment, and operating the engine 10' at or about an air/fuel ratio of 14:1, depending upon an anticipated need for ammonia. The ammonia produced in the catalytic device 48 as described hereinabove using the nitric oxide (NO), carbon monoxide (CO), and hydrogen ($H_2$) (212), is transferred downstream to the NH3-SCR device 50 for storage (215) while monitoring the NH3-SCR device 50 for saturation (218). So long as the NH3-SCR device 50 does not saturate, the control scheme 200' may operate within this loop to manage the exhaust gas feedstream.

When the control scheme 200' determines the NH3-SCR device 50 is saturated with ammonia (218), engine operation can be adjusted to discontinue ammonia production (221'). This includes responding to commands for engine operating conditions that are not conducive to ammonia production, including fuel cutoff events, e.g., during deceleration events and engine stopping, and transitioning engine operation to lean engine operation. The control scheme 200' discontinues controlling engine operation to produce ammonia when the NH3-SCR 50 saturates, and transitions engine operation to lean engine operation resulting in increased NOx emissions into the exhaust gas feedstream. Lean engine operation can include operating at an air/fuel ratio of about 16.0:1. The stored ammonia is depleted as ammonia molecules react with NOx molecules. The engine 10' may be commanded to operate lean of stoichiometry in response to engine and vehicle operation, including fuel cutoff events, e.g., during deceleration events, engine idling, and engine stopping events, as can occur with engine stop/start systems associated with hybrid powertrain system operation. The control scheme 200' preferably discontinues lean engine operation after detecting NOx breakthrough downstream from the NH3-SCR device 50 (224). After determining that ammonia is depleted or detecting NOx breakthrough, the control scheme 200' may modulate engine operation to produce ammonia (209').

Figure 13:
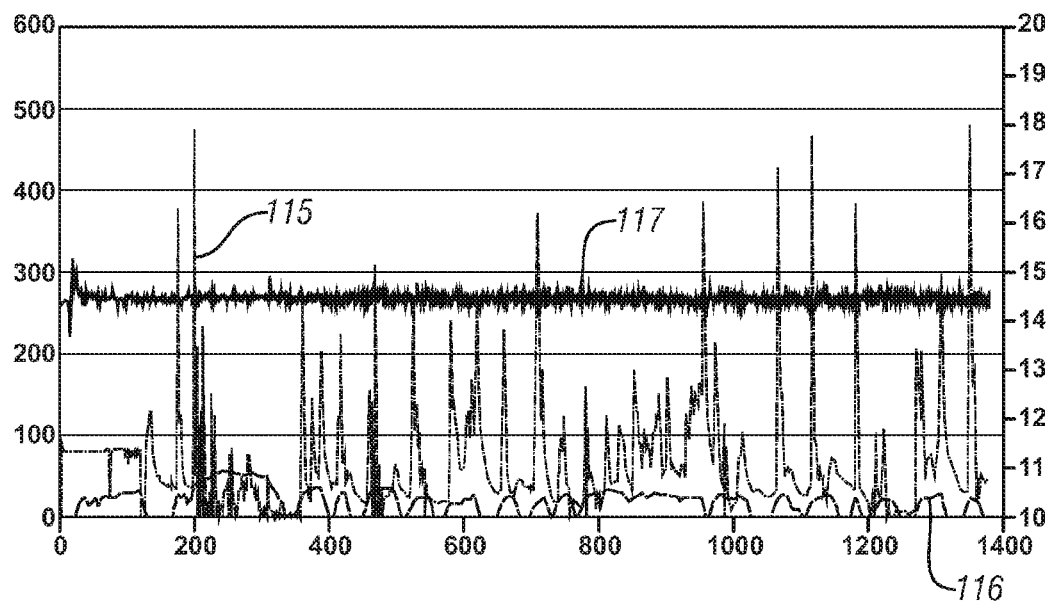

FIG. 13 graphically shows engine-out AFR, vehicle speed, and $NH_3$ generation over a series of acceleration and deceleration events for an exemplary vehicle including an engine 10' and aftertreatment system configured as illustrated in FIG. 10, with the engine 10' operating at stoichiometry. The x-axis represents a time in seconds, the left y-axis represents both $NH_3$ concentration in ppm and vehicle speed in MPH, and the right y-axis represents an AFR. Plot 115 represents $NH_3$ concentration, plot 116 represents vehicle speed, and plot 117 represents AFR. The series of acceleration and deceleration events are analogous to an FTP-18 driving cycle. The results indicate a substantial amount of ammonia being produced during stoichiometric engine operation.

Figure 14:
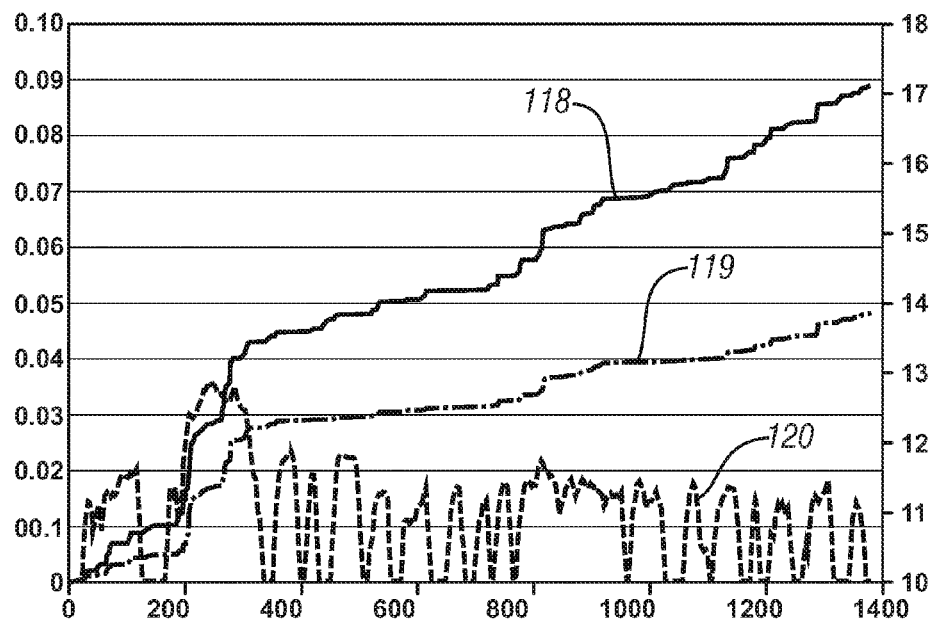

FIG. 14 graphically shows vehicle speed, and NOx emissions into and out of the NH3-SCR device 50 which includes an Fe—SCR device over a series of acceleration and deceleration events for an exemplary vehicle including an exemplary engine 10 and aftertreatment system, with the engine 10 operating at stoichiometry. The x-axis represents a time in seconds, the left y-axis represents cumulative NOx in grams/mile, and the right y-axis represents vehicle speed in MPH. Plot 118 represents a NOx post TWC value, plot 119 represents a NOx post SCR value, and plot 120 represents a vehicle speed. The series of acceleration and deceleration events are analogous to an FTP-18 driving cycle. The results indicate a reduction in NOx emissions across the NH3-SCR device in the presence of ammonia produced during stoichiometric engine operation.

Figure 15:
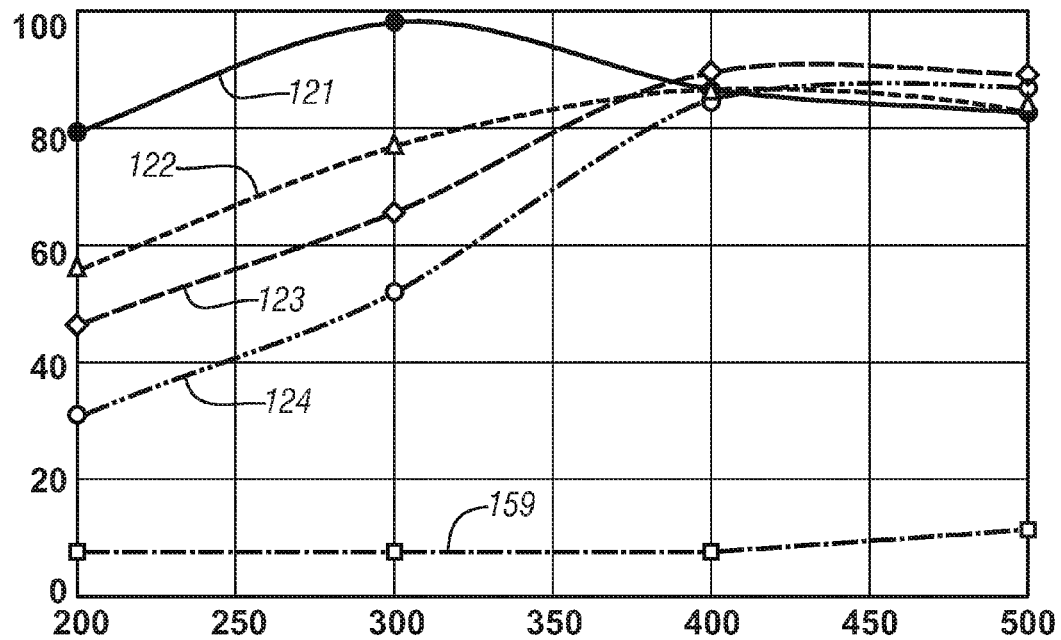
Figure 16:
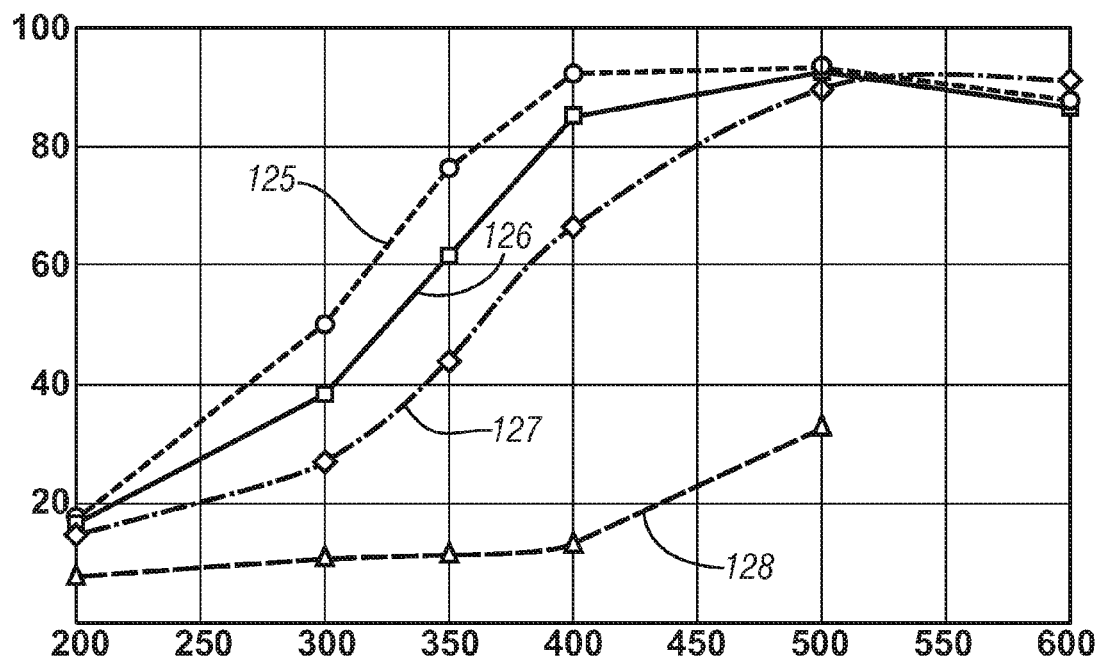

FIG. 15 graphically shows NOx conversion efficiency (%) corresponding to temperature across an NH3-SCR device using copper as the catalytic material. The x-axis represents a temperature in degrees Celsius, and the y-axis represents a NOx conversion percentage. Plot 121 represents a feedstream with 5 percent oxygen. Plot 122 represents a feedstream with 1 percent oxygen. Plot 123 represents a feedstream with 0.5 percent oxygen. Plot 124 represents a feedstream with 0.2 percent oxygen. Plot 159 represents a feedstream with 0 percent oxygen. The results indicate that there is low conversion efficiency when there is no oxygen ($O_2$) present, but that with low levels of oxygen, e.g., 0.5% concentration in the feedstream, the conversion efficiency increased substantially, including conversion efficiency in excess of 80% at 0.5% oxygen concentration in the feedstream when the temperature was at or above 350° C. FIG. 16 graphically shows NOx conversion efficiency (%) corresponding to temperature across an NH3-SCR device using iron as the catalytic material. The x-axis represents temperature in degrees Celsius, and the y-axis represents NOx conversion efficiency as a percentage. Plot 125 represents a feedstream with an oxygen concentration of 1000 ppm. Plot 126 represents a feedstream with an oxygen concentration of 500 ppm. Plot 127 represents a feedstream with an oxygen concentration of 100 ppm. Plot 128 represents a feedstream with an oxygen concentration of 0 ppm. The results indicate that there is low conversion efficiency when there is no oxygen ($O_2$) present, but that with low levels of oxygen concentration in the feedstream, e.g., 0.05% or 500 ppm, the conversion efficiency increased substantially, including a conversion efficiency in excess of 60% at 0.05% oxygen concentration in the feedstream when the temperature was at or above 350° C. The results of FIGS. 15 and 16 indicate that there can be substantial NOx conversion at exhaust gas feedstream conditions having low levels of oxygen, e.g., as occurs at stoichiometric engine operation.

The method described herein contemplates production of ammonia through engine modulation, utilizing components of the exhaust gas feedstream to sustain aftertreatment of NOx in an SCR device. It will be appreciated that these methods can be used in isolation from urea injection, with the methods described supplying all of the required ammonia. Alternatively, the methods described herein can be used to complement a urea injection system, extending the range of the system between required filling of a urea storage tank while allowing a full range of engine and powertrain operation without significant monitoring of ammonia production cycles and ammonia storage capacity, due to available urea injection on demand.

Ammonia generation cycles, as described above, can be operated under normal operation of the engine. For example, if the engine is operating at steady state under lean operating conditions, the engine control commands can be modulated to adjust to richer operation, creating rich zones in the exhaust necessary to deplete the oxygen from the aftertreatment system and subsequently produce ammonia. However, such a transition to richer operation consumes extra fuel that would otherwise not be used. Further, any such change in engine operation includes a potential adverse effect to drivability or the perception of the operator of the vehicle. A method can instead operate ammonia generation cycles during operation or transitions in operation that already include operation of the engine in stoichiometric or rich conditions or include transitions that can hide a transition to richer operation without adversely impacting drivability.

During periods when a vehicle or a powertrain output is accelerating, the engine and the transmission cooperate to transition through the acceleration. With the transmission in a selected gear setting, the engine will operate at increased torque and increasing speed. As described above, increasing torque and speed of an engine frequently requires a transition from a lean operating mode to a stoichiometric or rich operating mode. At some point, the increased torque and speed of the engine are interrupted and a transmission shift is initiated to a higher gear, increasing a speed of the output shaft for a given engine speed. Under normal operation, an exemplary method is known to quickly reduce the speed of the engine during a transmission shift, for example, including a deceleration fuel cut-off (DFCO) function. Once the new, high gear is achieved, the engine can resume operation at increased torque and increasing engine speed. This process continues until a desired vehicle speed is achieved. It will be appreciated that operating an ammonia generation cycle during a vehicle acceleration, a period in which conditions are already conducive to producing the constituent molecules of the ammonia generation reaction described above, can be beneficial as opposed to interrupting steady state operation in a lean operating mode to operate the ammonia generation cycle.

As described above, creating rich zones in the exhaust to produce hydrogen requires extra fuel be added at some point in the combustion-exhaust process, depending on the strategy used for generating the hydrogen. Hydrogen generation strategies include the rich operation of the engine, a late combustion fuel injection pulse, or a post-combustion fuel pulse. To minimize the amount of fuel necessary to produce these rich zones, the ammonia generation cycles can be triggered during accelerations when the engine would normally be operating in the stoichiometric or rich conditions. During stoichiometric operation the engine air/fuel ratio includes an AFR of about 14.6. During an exemplary ammonia generation cycle as described herein, the engine includes an AFR of about 14.0. The decrease in AFR from 14.6 to 14.0 requires a relatively small amount of extra fuel to be injected. By contrast, to transition from a lean operation including an AFR in excess of 20 into an ammonia generation cycle would require significantly more fuel. To accomplish this each time the engine transitions from lean to homogeneous combustion modes, the controller should evaluate the amount of $NH_3$ stored on the SCR and trigger an ammonia generation cycle if necessary. In some embodiments, operation in stoichiometric or rich conditions can be estimated based upon comparison to a lean operating limit based upon engine speed and load. By monitoring engine speed and load and comparing the engine speed and load to a lean operating limit, an ammonia generation cycle can be operated based upon the comparison.

During vehicle acceleration, a method can be utilized to monitor or estimate AFR according to methods known in the art and operate an ammonia generation cycle based upon the AFR indicating operation in a stoichiometric or rich condition. During a vehicle acceleration, a similar method can utilized to control generation of ammonia including monitoring a parameter representing operation of the engine, prior to an impending gear shift, projecting behavior of the parameter after the impending gear shift, comparing the parameter after the impending gear shift to a threshold delineating operation of the engine in one of a stoichiometric operation or rich operation, and operating the ammonia generation cycle after the impending gear shift based upon the comparing indicating the parameter exceeding the threshold.

As described above, ammonia generation cycles produce more ammonia per gram of fuel if the oxygen which is stored on the TWC has been depleted first. In one embodiment, this oxygen depletion can be accomplished by rich operation. In another embodiment, oxygen depletion can be facilitated or accomplished without expending extra fuel to achieve rich operation by disabling the DFCO function immediately prior to triggering the ammonia generation cycle on accelerations. DFCO conserves fuel during a shift by quickly reducing the injection of fuel into the engine. This fuel cut off reduces fuel in the cylinder more quickly than air being drawn into the engine can be reduced. As a result, DFCO causes the AFR to quickly increase and creates excess oxygen in the aftertreatment system that must be depleted to operate an ammonia generation cycle. In one exemplary configuration, implementing DFCO resulted in the AFR spiking from approximately 20 before the deceleration to approximately 100. If, instead, fuel flow is maintained to the engine by disabling the DFCO function while the air being drawn into the engine is being reduced during a drop in engine speed during the shift, AFR will remain moderated and oxygen will be more likely to be depleted from the aftertreatment system or a reduced amount of oxygen will be created. In one exemplary configuration, disabling DFCO resulted in the AFR changing from approximately 20 before the deceleration to between 20 and 30.

Benefits of disabling DFCO during a deceleration will depend upon a number of factors, including duration of the deceleration and the oxygen storage capacity of the aftertreatment system. Using the exemplary AFR values described above, if a system implementing DFCO results in an AFR of 100 while a system disabling DFCO results in an AFR of 30, the two systems will both result in oxygen being present within the aftertreatment system. The system implementing DFCO will fill any oxygen storage capacity more quickly than the system disabling DFCO, however, during a long deceleration, both systems may fill the oxygen storage capacity. Similarly, if the oxygen storage capacity of the aftertreatment system is small, both systems can quickly fill the oxygen storage capacity regardless of the status of the DFCO.

According to an exemplary embodiment of the methods disclosed herein, an engine operating prior to an impending shift can be monitored, an opportunity to operate an ammonia generation cycle after the shift can be determined prior to the shift, and the DFCO function can be disabled based upon the determined opportunity. As a result of the disabled DFCO function, oxygen within the aftertreatment system can be partially or completely depleted prior to operating the ammonia generation cycle after the shift. Disabling the DFCO function during the gear shift prior to transitioning out of lean operation based upon the determined opportunity to operate an ammonia generation cycle requires the engine controller to project speed and load, for example, as represented by pedal commands, for the period following the impending shift. By projecting that engine speed and load after the shift will achieve at least threshold levels whereat a transition to stoichiometric or rich operation will be commanded, a disabling of the DFCO can be controlled.

During some gear shift transitions, the engine will transition to an AFR necessary to produce ammonia or close to an AFR necessary to produce ammonia. Such a transition is predictable based upon a lean operating limit of the engine, describing engine speeds and loads whereat lean operation is not favorable or possible. During some exemplary vehicle accelerations, the lean operating limits will not be exceeded. For example, in some vehicle configurations, lean operating limits are not typically exceeded in the first two gears. In such exemplary configurations, upon the transition from second gear to third gear, an exemplary controller can extrapolate the rate of change for the vehicle speed, engine speed, and engine load. If the projected operation exceeds the lean operating limits of the engine, the controller prevent operation of the DFCO and perform an ammonia generation cycle upon throttle pedal tip-in immediately following the completion of the gear shift to the higher gear.

Determining an opportunity to operate an ammonia generation cycle after an impending shift can be determined based upon parameters available or determinable before the shift. The controller can use a number of tools to project these parameters. For example, engine speed can be utilized as the parameter to determine an opportunity to generate $NH_3$. In one exemplary comparison, a simple logarithmic plot of the engine speed can indicate when the vehicle is approaching an engine speed favorable to $NH_3$ generation. In another example, accelerator pedal position can be utilized as the parameter to determine an opportunity to generate $NH_3$. To predict the pedal position, an exemplary pedal projection factor can be utilized, the factor including an average of the last three seconds of the pedal position before the shift and multiplies that position by a gain factor, for example 140%. Different exemplary sample periods and different exemplary gain factors can be used. These prediction tools can include adaptive logic to be able to better predict the driver's behavior. In this way, an engine controller can compare a commanded throttle embodied in the pedal position to a threshold indicating favorable conditions to $NH_3$ generation. If the commanded throttle exceeds a predetermined threshold, the engine will enter an ammonia generation cycle. In configurations wherein throttle can be controlled by methods other than by accelerator pedal position, such as electronic control signals based upon an adaptive cruise control system utilized in combination with an automatic transmission, similar projections of engine conditions can be made based upon the information available to the cruise control system, such as a target speed, allowable rates of acceleration, and details regarding the operating environment of the vehicle, such as the presence of other vehicles in traffic and road conditions. Other parameters indicative of engine speed and engine load through a vehicle acceleration can be utilized to predict engine operation favorable to $NH_3$ generation. In one exemplary embodiment, vehicle location as determinable, for example, according to a GPS device in combination with a 3D map database can be utilized to predict upcoming operation of the vehicle, for example, including changes to road posted speeds and changes in road elevation. Such parameters can be used in isolation or can be used in combination with one of the above parameters to predict engine operation. An exemplary method to utilize a GPS device to aid management of the aftertreatment system, for example as disclosed in co-pending U.S. patent application Ser. No. 12/196,608, entitled USING GPS/MAP/TRAFFIC INFO TO CONTROL PERFORMANCE OF AFTERTREATMENT (AT) DEVICES, the contents of which are incorporated herein by reference, permits utilizing parameters determinable from GPS location and 3D map data to predict conditions within the aftertreatment system at some future time.

Figure 17:
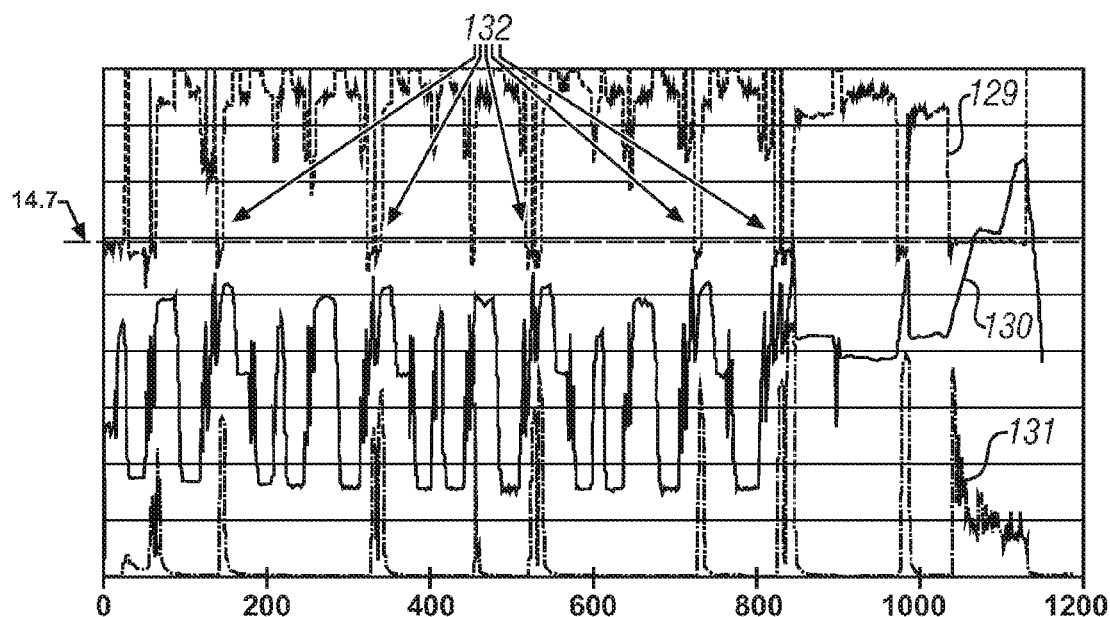
FIG. 17 illustrates AFR, engine speed, and $NH_3$ generation over a series of acceleration and deceleration events for an exemplary vehicle nominally operating under lean operating conditions with limited excursions to stoichiometric and rich operation, in accordance with the present disclosure.

FIG. 17 depicts AFR, engine speed, and $NH_3$ generation over a series of acceleration and deceleration events for an exemplary vehicle nominally operating under lean operating conditions with limited excursions to stoichiometric to rich operation, in accordance with the present disclosure. The x-axis represents a time in seconds. The left y-axis represents an AFR and the right y-axis represents an engine speed in RPM and an $NH_3$ concentration in ppm. Plot 129 represents an AFR. Plot 130 represents an engine speed. Plot 131 represents a close couple out $NH_3$. Reference 132 points to incidents of significant $NH_3$ generation. Engine speed is depicted to fluctuate through a series of increases and decreases through a depicted test period. AFR also fluctuates through the depicted test period. During a portion of the engine accelerations, as described above, engine speed and load change such that the AFR drops to the stoichiometric or rich operating ranges. Correlating the points whereat AFR drops to or below 14.6 to $NH_3$ generation, a clear pattern is depicted showing that any substantial $NH_3$ generation occurs when the AFR is in the stoichiometric or rich operating ranges.

Figure 18:
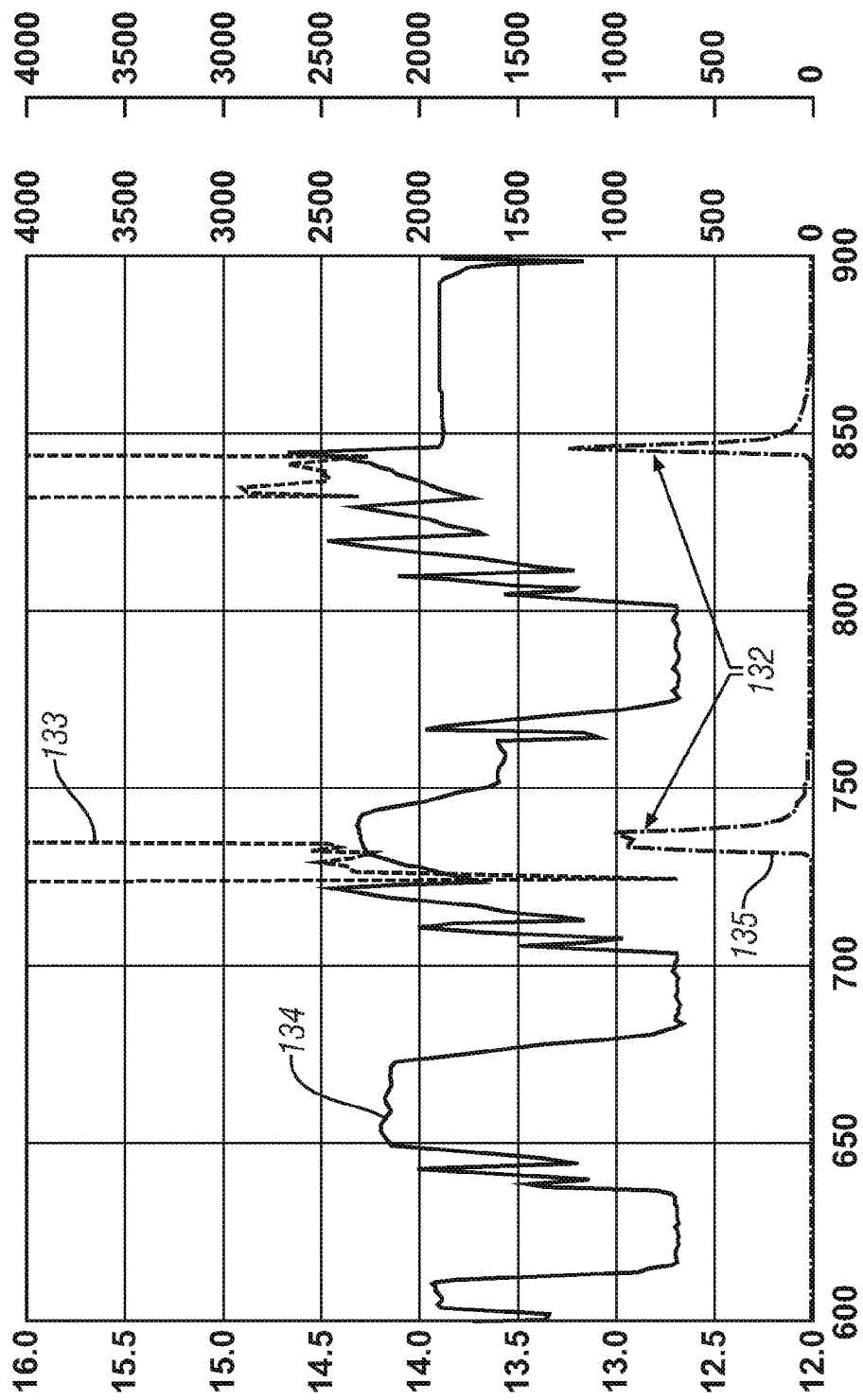
FIG. 18 illustrates AFR, engine speed, and $NH_3$ generation as described in FIG. 17, with FIG. 18 examining a smaller time span in greater detail, in accordance with the present disclosure.

FIG. 18 depicts AFR, engine speed, and $NH_3$ generation as represented in FIG. 17, with FIG. 18 examining a smaller time span in greater detail, in accordance with the present disclosure. The x-axis represents a time in seconds. The left y-axis represents an AFR and the right y-axis represents an engine speed in RPM and an $NH_3$ concentration in ppm. Plot 133 represents an AFR. Plot 134 represents an engine speed. Plot 135 represents a close couple out $NH_3$. Reference 132 points to incidents of significant $NH_3$ generation. In a testing cycle similar to the data represented in relation to FIG. 17, FIG. 18 depicts changes to engine speed resulting in changes to AFR, with the AFR dropping twice substantially below 14.6. In both instances, $NH_3$ generation begins some time lag after the drop in AFR. This lag or delay in the generation of $NH_3$ is consistent with oxygen being present in the aftertreatment system and requiring a period of stoichiometric or rich operation to deplete the oxygen before $NH_3$ can be generated.

Figure 19:
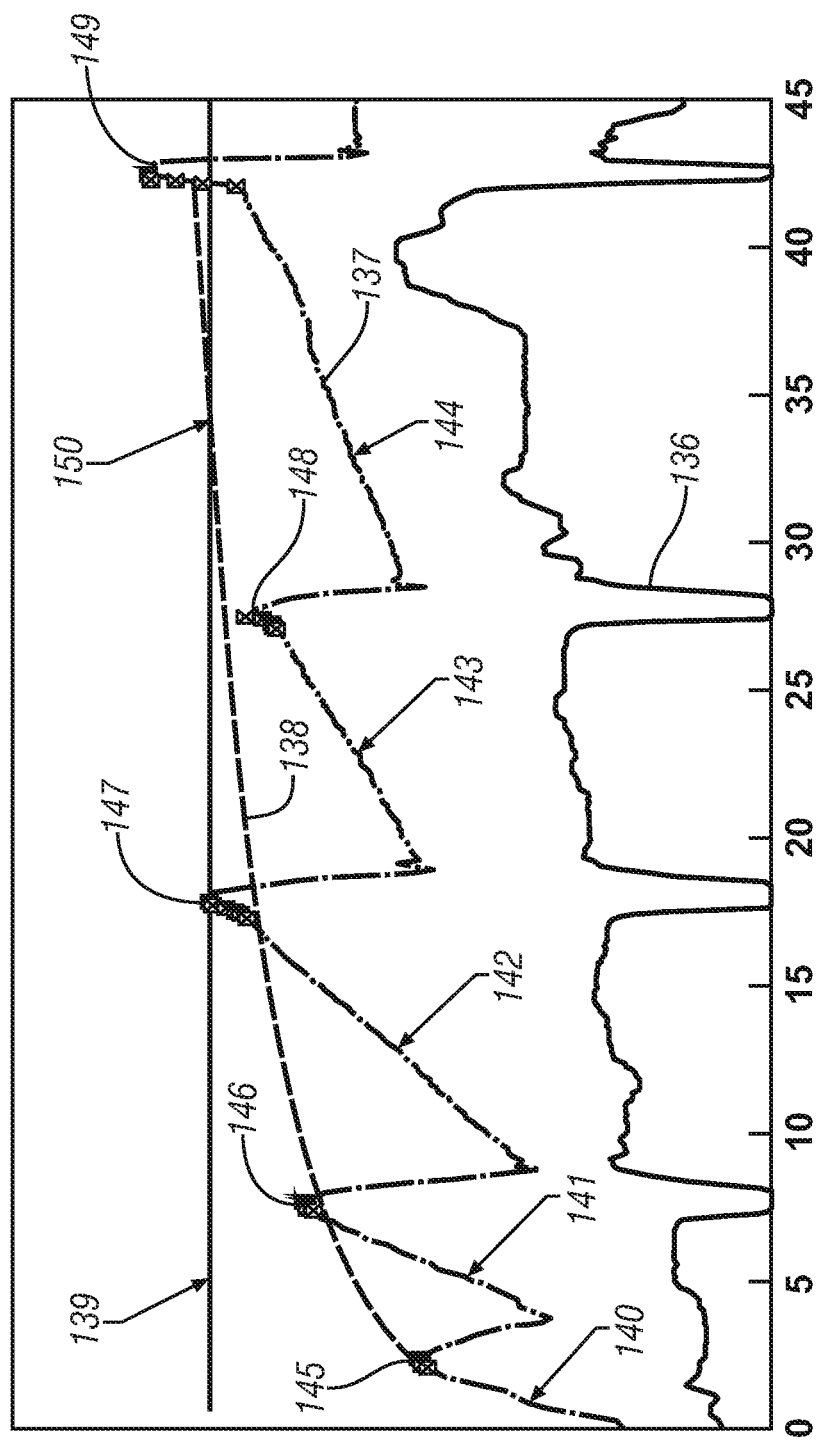
FIG. 19 illustrates an exemplary method utilizing a lean operating limit in combination with an engine speed projection through a vehicle acceleration to determine an opportunity to operate an ammonia generation cycle during a portion of the acceleration, in accordance with the present disclosure.

FIG. 19 depicts an exemplary method utilizing a lean operating limit in combination with an engine speed projection through a vehicle acceleration to determine an opportunity to operate an ammonia generation cycle during a portion of the acceleration, in accordance with the present disclosure. The x-axis represents time in seconds, and the y-axis represents both pedal position and engine speed. A predicted engine speed can be compared to a lean operating limit of the engine, and an ammonia generation cycle can be controlled based upon the comparing. FIG. 19 depicts a pedal position in plot 136; an engine speed in plot 137 through a series of increasing gear states 140, 141, 142, 143, and 144; a lean operating limit for the engine based upon engine speed in plot 139; and an engine speed trend line in plot 138. Through each the series of gear states, the engine speed increases to a high point, a gear shift is initiated, and the engine speed increase reoccurs in the new gear state. Based upon the pattern of engine speed increases and/or high points, the engine speed trend line can be projected. Based upon the engine speed trend line, an estimate can be made in one gear state before an impending shift whether the engine speed is likely to exceed the lean operating limit for the engine. In such an instance wherein engine speed is predicted in the next gear state to exceed the lean operating limit, an ammonia generation cycle can be operated in that next gear state according to the methods described above. Additionally, a command to disable DFCO during the next gear shift prior to the ammonia generation cycle can be generated based upon the prediction. In the data depicted in FIG. 19, operation of the fifth gear state is predicted, according to the projected engine speed trend line, to exceed the lean operating limit at point 150. According to the methods described herein and based upon this prediction, an ammonia generation cycle can be commanded through operation in the fifth gear state, and a DFCO function can be disabled during the shift between the fourth and fifth gear states.

An engine speed trend line can projected according to a number of methods. FIG. 19 depicts exemplary engine speed data points collected in the last four seconds of operation in each gear state, depicted by references 145, 146, 147, 148, and 149. These data points can be utilized according to methods known in the art to fit a projected curve based upon the data points. Other embodiments are envisioned using different periods of engine speed data point collection or utilizing any other determination or model sufficient to determine whether operation in an upcoming gear is likely to exceed the lean operating limit. FIG. 19 depicts a lean operating limit based upon engine speed for comparison to the engine speed trend line. It will be appreciated that the lean operating limit of an engine is also based upon engine load. A number of methods for selecting the lean operating limit based upon engine speed are envisioned. A lean operating limit can be value or a look-up table of values, for example based upon load, a functional formula describing a lean operating based upon monitored inputs, or determinable by any method sufficient to estimate the lean operating limit under current conditions.

Figure 20:
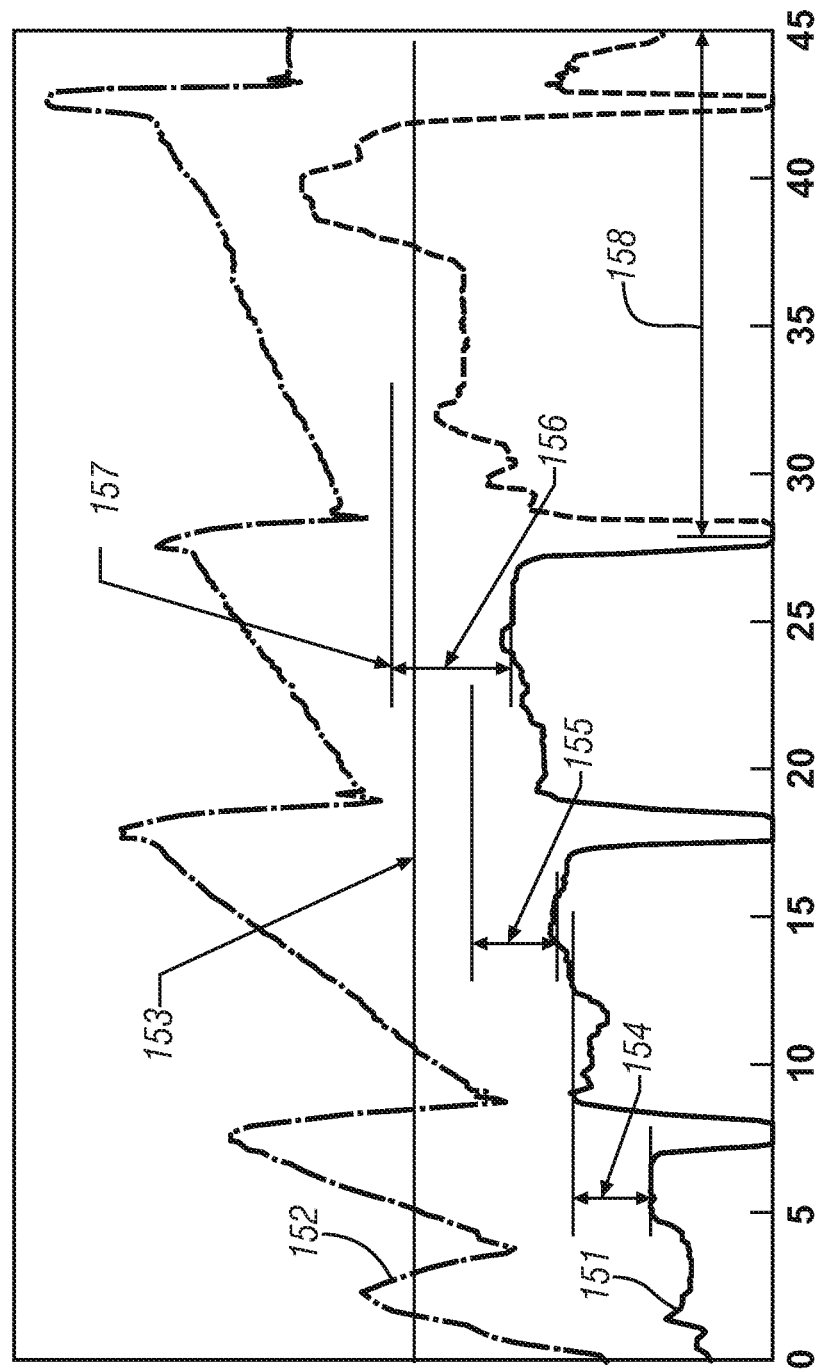
FIG. 20 illustrates an exemplary method utilizing a lean operating limit in combination with a projection of pedal position through a vehicle acceleration to determine an opportunity to operate an ammonia generation cycle during a portion of the acceleration, in accordance with the present disclosure.

FIG. 20 depicts an exemplary method utilizing a lean operating limit in combination with a projection of pedal position through a vehicle acceleration to determine an opportunity to operate an ammonia generation cycle during a portion of the acceleration, in accordance with the present disclosure. The x-axis represents a time in seconds, and the y-axis represents both a pedal position as a percentage and an engine speed. Plot 151 represents pedal position, and plot 152 represents engine speed. Similar to the method described in relation to FIG. 19, FIG. 20 depicts an exemplary method to compare predicted operation of the engine to a lean operating limit of the engine and control an ammonia generation cycle based upon the comparing. Whereas the method of FIG. 19 predicted engine speed through an acceleration, the method of FIG. 20 predicts pedal position through an acceleration. Pedal position can be utilized to represent how much engine speed and engine torque will increase through a period and periods of operation wherein AFR is likely to be in a stoichiometric or rich operating zone. Plot 153 represents a lean operating limit based upon pedal position. By selecting a lean operating limit based upon pedal position, the projected pedal position determined in a gear state can be used to control an ammonia generation cycle in another, higher gear state subsequent to a gear shift based upon a comparison to the lean operating limit.

FIG. 20 represents operation in second gear at approximately 6 seconds, operation in third gear at approximately 14 seconds, and operation in fourth gear at approximately 23 seconds, each instance including a current pedal position. FIG. 20 further represents predicted pedal positions in the next higher gear at each of these three instances based upon the current pedal position and a pedal projection factor. As described above, one exemplary pedal projection factor can be represented, the factor including an average of the last three seconds of the pedal position before the shift and multiplies that position by a gain factor, for example 140%. By summing the current pedal position and the pedal projection factor, a prediction of pedal position in the next higher gear or a projected pedal position after an impending gear shift can be made such that a determination can be made regarding operation of an ammonia generation cycle after the gear shift, as described herein. Predictions of pedal positions are depicted by span 154, span 155, and span 156. By comparing span 156 to lean operating limit 153, an ammonia generation cycle 158 can be initiated based upon span 156 exceeding the lean operating limit 153 at exemplary point 157. If the projected pedal position is greater than a threshold pedal position, then the ammonia generation cycle and disabling the DFCO can be operated according to the methods described herein.

A threshold pedal position or a lean operating limit based upon pedal position can be determined according to a number of methods. As described above, a lean operating limit can be determined according to a number of methods. A pedal position corresponding to a lean operating limit or a threshold pedal position can be determined through calibration, calculation, modeling, or any method sufficient to correspond pedal position with operation of the powertrain.

The test results described herein included operation of a gasoline SIDI engine. However, it will be appreciated that similar methods can be utilized for other engine configurations, for example, including operation with diesel fuel, ethanol blend fuels, or other similar fuel compositions. In applying the methods described herein for alternative fuel types, AFR values corresponding to stoichiometric and rich operation must be adjusted based upon the properties of the fuel utilized. Selection of aftertreatment devices and respective catalysts necessary to treat the exhaust gas flow and permitting the generation of ammonia will necessarily adjust based upon the engine configuration and fuel type utilized according to methods known in the art.

The test results described herein included operation of a vehicle with a manual transmission. However, it will be appreciated that the methods described herein can be utilized for other transmission configurations, for example, including operation of an automatic transmission. Based upon methods described herein, similar projections or engine operation can be made for a vehicle equipped with an automatic transmission, for example, describing a projected engine speed or a projected pedal position for the vehicle after an impending shift by the automatic transmission into a higher gear.

The methods above monitor a parameter prior to an impending gear shift and projecting a value of the parameter after the gear shift in order to control an ammonia generation cycle after the gear shift is completed. Determining a gear shift to be impending can be estimated according to a number of methods. For example, during a vehicle acceleration, operators of a manual transmission tend to change gears based upon acceleration of the engine speed. Once the engine speed is increased past a certain threshold or increased by a threshold amount over a time period, an impending gear shift can be estimated. In a vehicle utilizing an automatic transmission, an impending gear shift can be estimated according to methods known in the art, for example, based upon foot pedal position and engine speed.

The above methods and the necessary calculations for monitoring parameters, making necessary determinations, operating an ammonia generation cycle, and disabling the DFCO function can be operated within an engine control module. Alternatively, these methods can be performed in a separate control module, including a processor and memory, in communication with the engine control module. Alternatively, these methods can be performed in a plurality of control modules or in other devices or combinations of devices known in the art.

Figure 21:
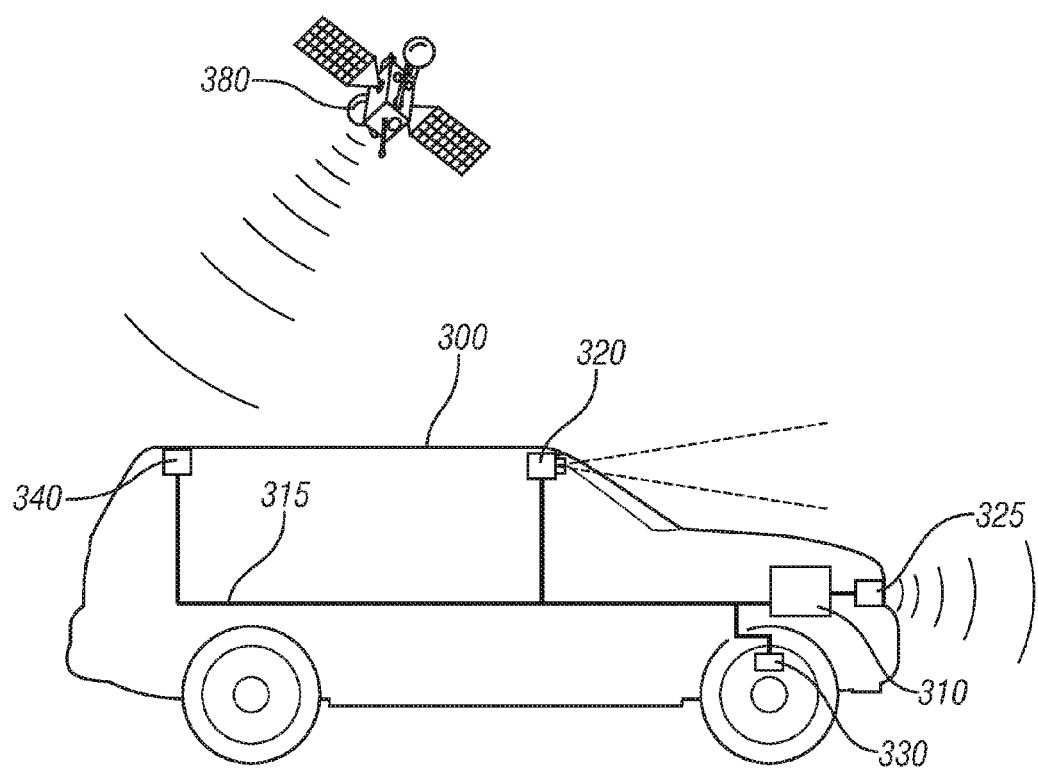
FIG. 21 illustrates an exemplary vehicle equipped sensors utilized in an adaptive cruise control system and a GPS device, in accordance with the present disclosure.

As described above, information made available through an adaptive cruise control system or a GPS device and 3D digital map combination can be utilized to predict operation of the engine according to the methods described herein. FIG. 21 depicts an exemplary vehicle equipped sensors utilized in an adaptive cruise control system and a GPS device, in accordance with the present disclosure. Vehicle 300 includes a control module 310; vehicle sensor systems, including camera system 320 and radar system 325; vehicle operation sensors, including vehicle speed sensor 330; and information systems, including GPS device 340. The control module 310 includes a programmable processor including programming to monitor various inputs and determine what information is appropriate to display upon the HUD and can be unitary with or separate from control module 5, described above. The control module 310 can communication directly with various systems and components, or the control module can alternatively or additionally communicate over a LAN/CAN system 315. The control utilizes information regarding an operational environment of the vehicle derived from a number of inputs. Camera system 320 includes a camera or image capturing device taking periodic or sequential images representing a view from the vehicle. Radar system 325 includes a device known in the art utilizing electromagnetic radiation to detect other vehicles or objects located near the vehicle. A number of known in-vehicle sensors are widely used within a vehicle to monitor vehicle speed, engine speed, wheel slip, and other parameters descriptive of the operation of the vehicle. Exemplary vehicle speed sensor 330 is depicted to represent such an in-vehicle sensor describing vehicle operation, but the disclosure intends to include any such sensors for use by the control module 310. GPS device 340 is a device known in the art for communicating with resources outside of the vehicle, for example, satellite system 380. GPS device 340 may be utilized in conjunction with a 3D map database including detailed information relating to a global coordinate received by the GPS device 340 regarding the current location of the vehicle. Based upon the inputs available, control module 310 can employ the methods described herein and generate commands that control an ammonia generation cycle and, optionally, disabling the DFCO function.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating an ammonia generation cycle in an internal combustion engine and a connected aftertreatment system, the method comprising:
   operating a deceleration fuel cut-off function command during normal operation of the engine, the deceleration fuel cut-off function command depriving the engine of fuel during deceleration events;
   monitoring operation of the engine and the aftertreatment system;
   determining a need to generate ammonia based upon the monitored operation;
   based upon the determined need and prior to executing the deceleration fuel cut-off function command for an impending deceleration event:
      determining a present oxygen storage amount in the aftertreatment system based upon the monitored operation;
      monitoring driver commands to the engine;
      determining a predicted deceleration time for the impending deceleration event based upon the monitored operation and the monitored commands;
      determining a predicted air to fuel ratio in the aftertreatment system if the deceleration fuel cut-off function command is executed during the impending deceleration event;
      determining a predicted oxygen storage content in the aftertreatment system after the deceleration event based upon the predicted air to fuel ratio in the aftertreatment system if the deceleration fuel cut-off function command is executed and the present oxygen storage amount;
      determining a predicted air to fuel ratio in the aftertreatment system if the deceleration fuel cut-off function command is not executed during the impending deceleration event;
      determining a predicted oxygen storage content in the aftertreatment system after the deceleration event based upon the predicted air to fuel ratio in the aftertreatment system if the deceleration fuel cut-off function command is not executed and the present oxygen storage amount;
      comparing the predicted oxygen storage contents; and
      selectively overriding the deceleration fuel cut-off function command based upon the comparing indicating an ability to reduce oxygen storage in the aftertreatment system during the impending deceleration event.

2. The method of claim 1, further comprising:
   based upon the monitored driver commands, the need to generate ammonia, and the present oxygen storage amount, operating the ammonia generation cycle.

3. The method of claim 2, wherein operating the ammonia generation cycle comprises:
   monitoring a parameter of engine operation during operation in a first gear;
   prior to an impending gear shift to a second gear, projecting behavior of the parameter of engine operation after the impending gear shift based on the monitored parameter of engine operation during operation in a first gear;
   comparing the parameter of engine operation after the impending gear shift to a threshold delineating operation of the engine in one of a stoichiometric operation and rich operation; and
   operating the ammonia generation cycle after the impending gear shift based upon the comparing indicating the parameter of engine operation exceeding the threshold.

4. The method of claim 3, wherein the parameter of engine operation comprises an engine speed, and wherein the threshold comprises a lean operating limit based upon the engine speed.

5. The method of claim 3, wherein the parameter of engine operation comprises an accelerator pedal position, and wherein the threshold comprises a threshold accelerator pedal position.

6. The method of claim 5, wherein projecting behavior of the parameter of engine operation after the impending gear shift comprises:
   monitoring a current accelerator pedal position; and
   determining a projected accelerator pedal position based upon the current accelerator pedal position and an accelerator pedal projection factor.

7. The method of claim 3, wherein the parameter of engine operation comprises signals from an adaptive cruise control system; and
   the method further comprising determining an opportunity to operate an ammonia generation cycle after the impending gear shift based upon the signals from the adaptive cruise control system.

8. The method of claim 3, further comprising monitoring a vehicle position based upon data from a GPS device and a 3D map database; and
   wherein the parameter of engine operation is based upon the monitored vehicle position.

9. The method of claim 3, wherein the threshold comprises a lean operating limit for the engine.

10. The system of claim 2, wherein the programming operating the ammonia generation cycle comprises programming configured to:
    monitor a parameter of engine operation during operation in a first gear;
    prior to an impending gear shift to a second gear, project behavior of the parameter of engine operation after the impending gear shift based on the monitored parameter of engine operation during operation in a first gear;
    compare the parameter of engine operation after the impending gear shift to a threshold delineating operation of the engine in one of a stoichiometric operation and rich operation; and
    operate the ammonia generation cycle after the impending gear shift based upon the comparing indicating the parameter of engine operation exceeding the threshold.

11. The system of claim 10, further comprising:
an engine speed sensor;
wherein monitoring the parameter of engine operation comprises monitoring the engine speed sensor and an engine load; and
wherein the threshold comprises a lean operating limit based upon engine speed and engine load.

12. The system of claim 10, further comprising:
an accelerator pedal position sensor;
wherein monitoring the parameter of engine operation comprises monitoring the accelerator pedal position sensor; and
wherein the threshold comprises a lean operating limit accelerator pedal position.

13. A system for operating an ammonia generation cycle in an internal combustion engine and a connected aftertreatment system, the system comprising:
a control module including programming configured to electronically control the engine, the control module configured to:
operate a deceleration fuel cut-off function command during normal operation of the engine, the deceleration fuel cut-off function command depriving the engine of fuel during deceleration events;
monitor operation of the engine and the aftertreatment system;
determine a need to generate ammonia based upon the monitored operation;
based upon the determined need and prior to executing the deceleration fuel cut-off function command for an impending deceleration event:
determine a present oxygen storage amount in the aftertreatment system based upon the monitored operation;
monitoring driver commands to the engine;
determine a predicted deceleration time for the impending deceleration event based upon the monitored operation and the monitored commands;
determine a predicted air to fuel ratio in the aftertreatment system if the deceleration fuel cut-off function command is executed during the impending deceleration event;
determine a predicted oxygen storage content in the aftertreatment system after the deceleration event based upon the predicted air to fuel ratio in the aftertreatment system if the deceleration fuel cut-off function command is executed and the present oxygen storage amount;
determine a predicted air to fuel ratio in the aftertreatment system if the deceleration fuel cut-off function command is not executed during the impending deceleration event;
determine a predicted oxygen storage content in the aftertreatment system after the deceleration event based upon the predicted air to fuel ratio in the aftertreatment system if the deceleration fuel cut-off function command is not executed and the present oxygen storage amount;
compare the predicted oxygen storage contents; and
selectively override the deceleration fuel cut-off function command based upon the comparing indicating an ability to reduce oxygen storage in the aftertreatment system during the impending deceleration event.

14. The system of claim 13, the programming being further configured to:
based upon the monitored driver commands, the need to generate ammonia, and the present oxygen storage amount, operate the ammonia generation cycle.

15. The system of claim 10, further comprising:
an engine speed sensor;
wherein monitoring the parameter of engine operation comprises monitoring the engine speed sensor; and
wherein the threshold comprises a lean operating limit engine speed.

* * * * *